United States Patent
Saito et al.

(10) Patent No.: US 6,215,612 B1
(45) Date of Patent: Apr. 10, 2001

(54) MAGNETIC RECORDING/REPRODUCTION APPARATUS HAVING A ROTARY HEAD CYLINDER AND A MECHANISM FOR PASSING A MAGNETIC TAPE AROUND THE ROTARY HEAD CYLINDER FOR A PREDETERMINED ARC

(75) Inventors: Yoshiyuki Saito, Katano; Akio Konishi, Sanda; Koichiro Hirabayashi, Hirakata; Tatsuo Terao, Niihama, all of (JP)

(73) Assignee: Matsushita Electric Industrial, Osaka (JP)

( * ) Notice: Subject to any disclaimer, the term of this patent is extended or adjusted under 35 U.S.C. 154(b) by 0 days.

(21) Appl. No.: 09/266,316

(22) Filed: Mar. 11, 1999

(30) Foreign Application Priority Data

Mar. 19, 1998 (JP) ................................. 10-070179

(51) Int. Cl.[7] .................................................. G11B 15/28
(52) U.S. Cl. ............................ 360/96.4; 360/85; 360/95; 360/96.1
(58) Field of Search .................................. 360/85, 95, 93, 360/96.1, 96.3, 96.4, 137

(56) References Cited

U.S. PATENT DOCUMENTS

| 4,358,797 | 11/1982 | Nishijima et al. | 360/14.2 |
| 4,491,885 | 1/1985 | Morikawa et al. | 360/85 |

(List continued on next page.)

FOREIGN PATENT DOCUMENTS

| 63-7550 | * | 1/1988 | (JP) . |
| 03207046 | | 9/1991 | (JP) . |
| 4-129054 | * | 4/1992 | (JP) . |
| 05020748 | | 1/1993 | (JP) . |
| 05028600 | | 2/1993 | (JP) . |

(List continued on next page.)

OTHER PUBLICATIONS

PTO – 892 Form from Notice of Allowance dated Jun. 5, 1000 for USSN 09/266,315.

PTO – 892 Form from Office Action dated Jun. 6, 2000 for USSN 09/268,262.

(List continued on next page.)

Primary Examiner—Jefferson Evans
(74) Attorney, Agent, or Firm—Renner, Otto, Boisselle & Sklar

(57) ABSTRACT

A magnetic recording/reproduction apparatus of the present invention, which records/reproduces information on/from a magnetic tape by passing the tape around a rotary head cylinder having a rotary head for a predetermined arc, includes: a capstan shaft; a pinch roller; a first reel base rotatably attached to a shaft; a second reel base rotatably attached to a shaft; and an idler supported swingably to swing to the second reel base when the capstan is rotated in a first direction and to the first reel base when the capstan shaft is rotated in a second direction, wherein the idler includes a gear portion which rotates in association with the rotation of the capstan shaft. The above components of the magnetic recording/reproduction apparatus are situated in such a manner that when the running of a magnetic tape is to be shifted from a first direction to a second direction, the rotation of the capstan shaft, in the first direction stops, the pinch roller moves away from the capstan shaft, the capstan shaft is rotated in the second direction by a predetermined amount so that the idler swings to the first reel base, the capstan shaft stops again, the pinch roller presses the magnetic tape against the capstan shaft, and the capstan shaft is rotated again in the second direction and the gear portion to be coupled with the first reel base, the gear portion rotating the first reel base in a direction in which the magnetic tape is wound onto the first reel.

7 Claims, 35 Drawing Sheets

U.S. PATENT DOCUMENTS

| | | | | |
|---|---|---|---|---|
| 4,530,038 | | 7/1985 | Narita | 360/74.1 |
| 4,591,935 | * | 5/1986 | Kouda | 242/356.4 |
| 4,685,008 | * | 8/1987 | Ohyama | 360/85 |
| 4,951,164 | | 8/1990 | Yasaka et al. | 360/85 |
| 5,070,422 | * | 12/1991 | Sasaki et al. | 360/96.3 X |
| 5,101,311 | | 3/1992 | Richmond | 360/69 |
| 5,159,506 | | 10/1992 | Eino et al. | 360/85 |
| 5,184,262 | * | 2/1993 | Watanabe et al. | 360/96.2 |
| 5,206,771 | * | 4/1993 | Katou et al. | 360/71 |
| 5,262,909 | * | 11/1993 | Chiou et al. | 360/95 X |
| 5,307,221 | * | 4/1994 | Mikawa et al. | 360/96.3 |
| 5,313,345 | | 5/1994 | Schandl et al. | 360/74.1 |
| 5,327,306 | * | 7/1994 | Kondo et al. | 360/96.5 |
| 5,395,067 | * | 3/1995 | Kano et al. | 242/344 |
| 5,438,468 | * | 8/1995 | Hasegawa et al. | 360/107 |
| 5,445,337 | * | 8/1995 | Kwon | 242/334.6 |
| 5,452,160 | * | 9/1995 | Sakuma et al. | 360/96.3 |
| 5,546,259 | * | 8/1996 | Iwata et al. | 360/130.22 |
| 5,609,310 | * | 3/1997 | Kobayashi | 242/334.6 |
| 5,650,888 | | 7/1997 | Kuwajima | 360/85 |
| 5,689,385 | * | 11/1997 | Koguchi et al. | 360/96.1 |
| 5,697,568 | * | 12/1997 | Ishii | 242/334.6 |
| 5,699,208 | * | 12/1997 | Kim et al. | 360/95 X |
| 5,701,214 | * | 12/1997 | Inoue et al. | 360/71 |
| 5,719,728 | * | 2/1998 | Miyazaki | 360/96.3 |
| 5,726,827 | | 3/1998 | Moriyama | 360/85 |
| 5,757,570 | * | 5/1998 | Kiriyama et al. | 360/71 |
| 5,772,142 | * | 6/1998 | Ahn | 242/334.6 |
| 5,790,342 | | 8/1998 | Konishi et al. | 360/95 |
| 5,859,744 | * | 1/1999 | Kim et al. | 360/85 |
| 5,923,495 | | 7/1999 | Matsuoka et al. | 360/85 |
| 5,953,185 | * | 9/1999 | Lee | 360/130.23 |
| 5,963,394 | | 10/1999 | Yamabuchi et al. | 360/85 |
| 6,008,963 | | 12/1999 | Nemoto et al. | 360/85 |

FOREIGN PATENT DOCUMENTS

| | | | | |
|---|---|---|---|---|
| 6-36424 | * | 2/1994 | (JP) . | |
| 6-131763 | * | 5/1994 | (JP) . | |
| 6203431 | * | 7/1994 | (JP) . | 242/334.6 |
| 06215455 | | 8/1994 | (JP) . | |
| 7-282427 | * | 10/1995 | (JP) . | |
| 07296347 | | 11/1995 | (JP) . | |

OTHER PUBLICATIONS

PTO – 892 Form from Notice of Allowance dated May 22, 2000 for USSN 09/268,904.

PTO – 892 Form from Notice of Allowance dated May 22, 2000 for USSN 09/270,238.

* cited by examiner

MAGNETIC RECORDING/REPRODUCTION APPARATUS HAVING A ROTARY HEAD CYLINDER AND A MECHANISM FOR PASSING A MAGNETIC TAPE AROUND THE ROTARY HEAD CYLINDER FOR A PREDETERMINED ARC

BACKGROUND OF THE INVENTION

1. Field of the Invention

The present invention relates to a magnetic recording/reproduction apparatus.

2. Description of the Related Art

An example of conventional magnetic recording/reproduction apparatus is disclosed in Japanese Laid-Open Utility Model Publication No. 61-195552. Referring to FIG. 37, the conventional magnetic recording/reproduction apparatus will be described.

A conventional magnetic recording/reproduction apparatus 300 includes a typical tape path where a tape 316 is drawn out from a tape cassette 310 and passes around a rotary head cylinder 318 for recording and reproduction.

The tape 316 is driven by rotating a capstan 320 with a capstan motor 323 while a pinch roller 319 is pressed against the capstan 320. The rotation of the capstan motor 323 is also transmitted to a fixed gear 332 and a swing gear 334 via gears 324 and 325 and a timing belt 326, and then transmitted selectively to a driving gear 328 of an S reel base 301 or a driving gear 329 of a T reel base 302.

The swing gear 334 is swingably attached to a shaft 339 extending from a swing plate 333, which is in turn swingably attached to a shaft of the fixed gear 332.

In the conventional magnetic recording/reproduction apparatus having the above configuration, when the tape is to be sent forward (e.g., when recorded images are to be reproduced, the tape is to be fast-forwarded, etc.), the apparatus works as follows. The capstan motor 323 is rotated forward (counterclockwise (CCW)), rotating the capstan 320 forward. This allows the tape 316 to be sent forward. At the same time, the rotation of the capstan 320 is transmitted to the fixed gear 332 via the timing belt 326, which causes the swing plate 333 to swing clockwise (CW) around a shaft 331 and thus the swing gear 334 to engage with the driving gear 329 of the T reel base 302. The T reel base 302 then rotates clockwise, thereby allowing the tape 316 to be wound onto a winding reel inside the tape cassette 310.

In reverse, when the tape is to be sent backward (e.g., when recorded images are to be reproduced in reverse, the tape is to be rewound, etc.), the apparatus works as follows. The capstan motor 323 is rotated backward (clockwise), rotating the capstan 320 backward. This allows the tape 316 to be sent backward. At the same time, the rotation of the capstan 320 is transmitted to the fixed gear 332 via the timing belt 326, which causes the swing plate 333 to swing counterclockwise around the shaft 331 and thus the swing gear 334 to engage with the driving gear 328 of the S reel base 301. The S reel base 301 then rotates counterclockwise thereby allowing the tape 316 to be wound onto a supply reel inside the tape cassette 310.

In the above conventional configuration, a problem arises when it is attempted to shift the mode from a mode in which the tape is sent forward (e.g., a reproduction mode) to a mode in which the tape is sent backward (e.g., a reverse reproduction mode). That is, when the direction of the rotation of the capstan 320 is reversed from counterclockwise to clockwise while the pinch roller 319 being kept pressed against the capstan 320, the portion of the tape 316 located at the capstan 320 immediately starts to be sent backward. On the contrary, in order to complete the mode shift, the swing gear 334 must move from the position at which it is engaged with the driving gear 329 of the T reel base 302 (shown by the solid lines in FIG. 37) to the position at which it is engaged with the driving gear 328 of the S reel base 301 (shown by the one-dot chain lines in FIG. 37). Accordingly, a certain time lag arises from the start of the backward rotation of the capstan 320 until the S reel base 301 starts winding the tape 316, causing slacking of the tape 316 in the tape path.

During the above time lag, the tape 316 passes around the rotary head cylinder 318 at a tension lower than a normal tension. At such a low tension, it is impossible for a head mounted on the rotary head cylinder 318 to effect magnetic recording/reproduction, resulting in failure in displaying reversely reproduced images. Moreover, when the tape slacking is great, the tape 316 tends to be displaced from posts 317A and 317B which guide the tape 316. If the tape 316 continues to run in the displaced state, the tape 316 will be greatly damaged. This problem also applies to the case of the mode shift from the mode in which the tape is sent backward to the mode in which the tape is sent forward.

The object of the present invention is to provide a highly reliable mechanism in which the mode shift is effected without causing slacking of a tape when the mode is shifted from a forward mode to a backward mode or vice versa, so as to be free from discontinuity of images and damaging of the tape.

SUMMARY OF THE INVENTION

The magnetic recording/reproduction apparatus of this invention records/reproduces information on/from a magnetic tape by drawing out the magnetic tape from a tape cassette and allowing the magnetic tape to pass around a rotary head cylinder having a rotary head for a predetermined arc. The apparatus includes: a capstan shaft for driving the magnetic tape; a pinch roller for pressing the magnetic tape against the capstan shaft; a first reel base rotatably attached to a shaft, the first reel base engaging with a first reel for holding the magnetic tape wound onto the first reel located in the tape cassette; a second reel base rotatably attached to a shaft, the second reel base engaging with a second reel for holding the magnetic tape wound onto the second reel located in the tape cassette; and an idler supported swingably to swing to the second reel base when the capstan shaft is rotated in a first direction and to the first reel base when the capstan shaft is rotated in a second direction, wherein the idler includes a gear portion which rotates in association with the rotation of the capstan shaft, when the running of the magnetic tape is to be shifted from the first direction to the second direction, the rotation of the capstan shaft in the first direction stops, the pinch roller moves away from the capstan shaft, the capstan shaft is rotated in the second direction by a predetermined amount so that the idler swings to the first reel base, the capstan shaft stops again, the pinch roller presses the magnetic tape against the capstan shaft, and the capstan shaft is rotated again in the second direction to allow the magnetic tape to run in the second direction and the gear portion to be coupled with the first reel base, the gear portion rotating the first reel base in a direction in which the magnetic tape is wound onto the first reel.

In one embodiment of the invention, the first reel includes a supply reel, the first reel base includes a supply reel base, the second reel includes a winding reel, the second reel base includes a winding reel base, the first direction includes a forward direction in which the magnetic tape runs from the supply reel toward the winding reel, and the second direction includes a backward direction in which the magnetic tape runs from the winding reel toward the supply reel.

In another embodiment of the invention, the first reel includes a winding reel, the first reel base includes a winding reel base, the second reel includes a supply reel, the second reel base includes a supply reel base, the first direction includes a backward direction in which the magnetic tape runs from the winding reel toward the supply reel, and the second direction includes a forward direction in which the magnetic tape runs from the supply reel toward the winding reel.

In still another embodiment of the invention, the magnetic recording/reproduction apparatus includes: a first state in which the magnetic tape runs in the forward direction from the supply reel to the winding reel; a second state in which the magnetic tape runs in the backward direction from the winding reel to the supply reel; a third state in which the rotation of the capstan shaft stops and then the pinch roller moves away from the capstan shaft, and the magnetic recording/reproduction apparatus includes a mechanism in which the third state is placed between the first state and the second state.

In still another embodiment of the invention, when the running of the magnetic tape is to be shifted from the first direction to the second direction, the rotation of the capstan shaft in the first direction stops, the pinch roller moves away from the capstan shaft, the capstan shaft is rotated in the second direction by a predetermined amount so that the gear portion is coupled with the first reel base to rotate the first reel base in a direction in which the magnetic tape is wound onto the first reel, the capstan shaft stops again, the pinch roller presses the magnetic tape against the capstan shaft, and the capstan shaft is rotated again in the second direction to allow the magnetic tape to run in the second direction and to allow the first reel base to rotate in the direction in which the magnetic tape is wound onto the first reel.

In still another embodiment of the invention, the first reel includes a supply reel, the first reel base includes a supply reel base, the second reel includes a winding reel, the second reel base includes a winding reel base, the first direction includes a forward direction in which the magnetic tape runs from the supply reel toward the winding reel, and the second direction includes a backward direction in which the magnetic tape runs from the winding reel toward the supply reel.

In still another embodiment of the invention, the first reel includes a winding reel, the first reel base includes a winding reel base, the second reel includes a supply reel, the second reel base includes a supply reel base, the first direction includes a backward direction in which the magnetic tape runs from the winding reel toward the supply reel, and the second direction includes a forward direction in which the magnetic tape runs from the supply reel toward the winding reel.

Thus, the invention described herein makes possible the advantage of providing a magnetic recording/reproduction apparatus with a highly reliable mechanism in which the mode shift is effected without causing slacking of a tape when the mode is shifted from a forward mode to a backward mode or vice versa, so as to be free from discontinuity of images and damaging of the tape.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of example with reference to the accompanying drawings.

Figure 1:
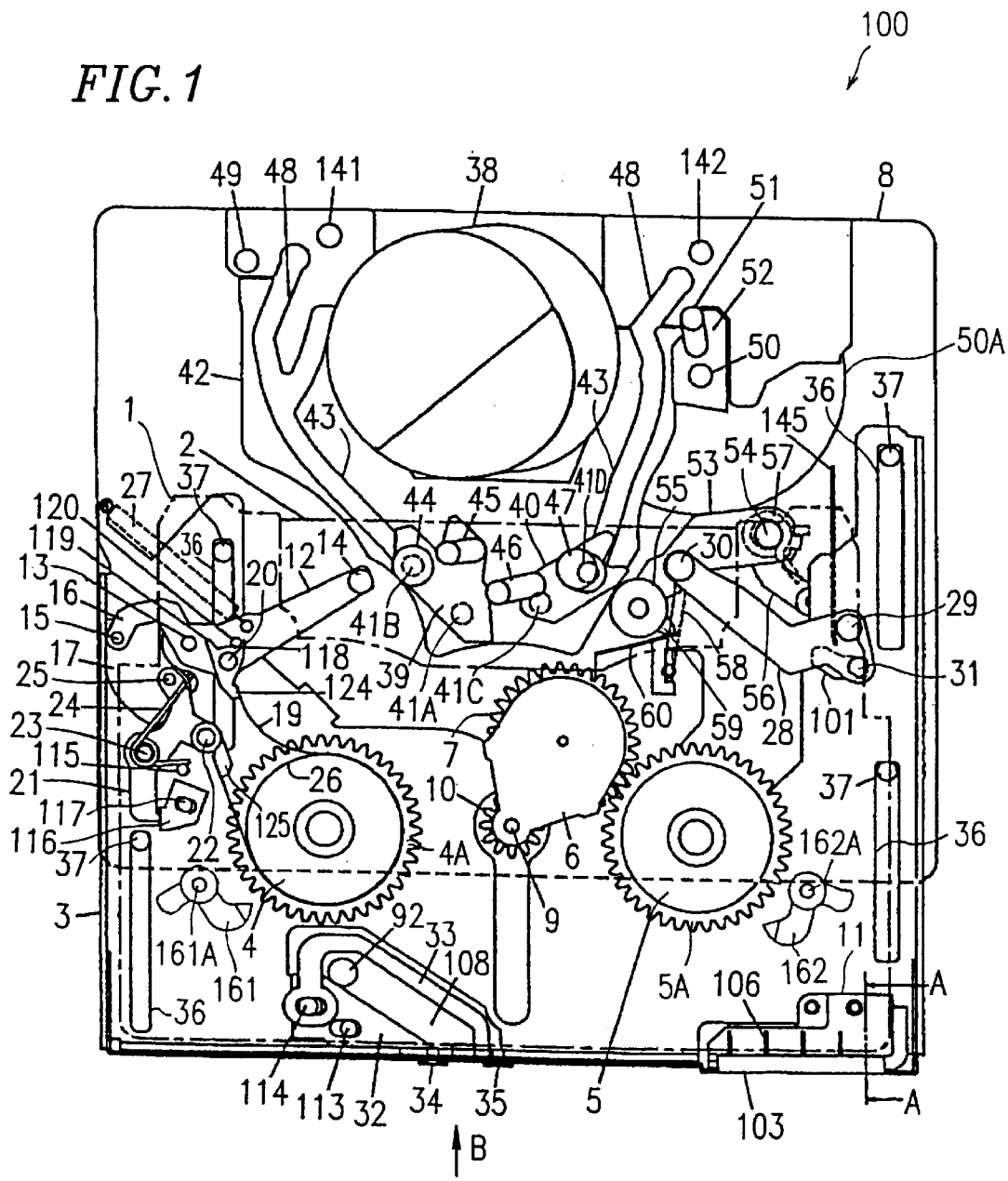
FIG. 1 is a plan view of an embodiment of the magnetic recording/reproduction apparatus according to the present invention, illustrating a state in which a cassette can be placed/removed (UNLOADED mode)

FIG. 1 is a plan view of a magnetic recording/reproduction apparatus 100 of an embodiment according to the present invention in an UNLOADED mode in which a cassette can be placed/removed. In FIG. 1, some components are omitted for simplification.

A tape 2 is wound on two reels (not shown) placed inside a cassette 1. In FIG. 1, for easy viewing, only the outline of the cassette 1 is shown (by the one-dot chain lines), and only the portion of the tape 2 which extends outside the cassette 1 is shown (by the one-dot chain lines). The cassette 1 is placed on a sub-chassis 3. An S reel base 4 and a T reel base 5 are rotatably mounted on the sub-chassis 3 and engage the two reels (not shown) inside the cassette 1.

An idler 6 is swingably attached to a center gear shaft 9 extending from a main chassis 8. A center gear 10 is rotatably attached to the center gear shaft 9. An idler gear 7, which is attached to a shaft of the idler 6, is rotated by the center gear 10, and engages with external gears of the S reel base 4 and the T reel base 5 to rotate the S reel base 4 and the T reel base 5. A memory read switch (MIC-SW) 11 for reading data from a memory in the cassette 1 is mounted on the sub-chassis 3.

Figure 2:
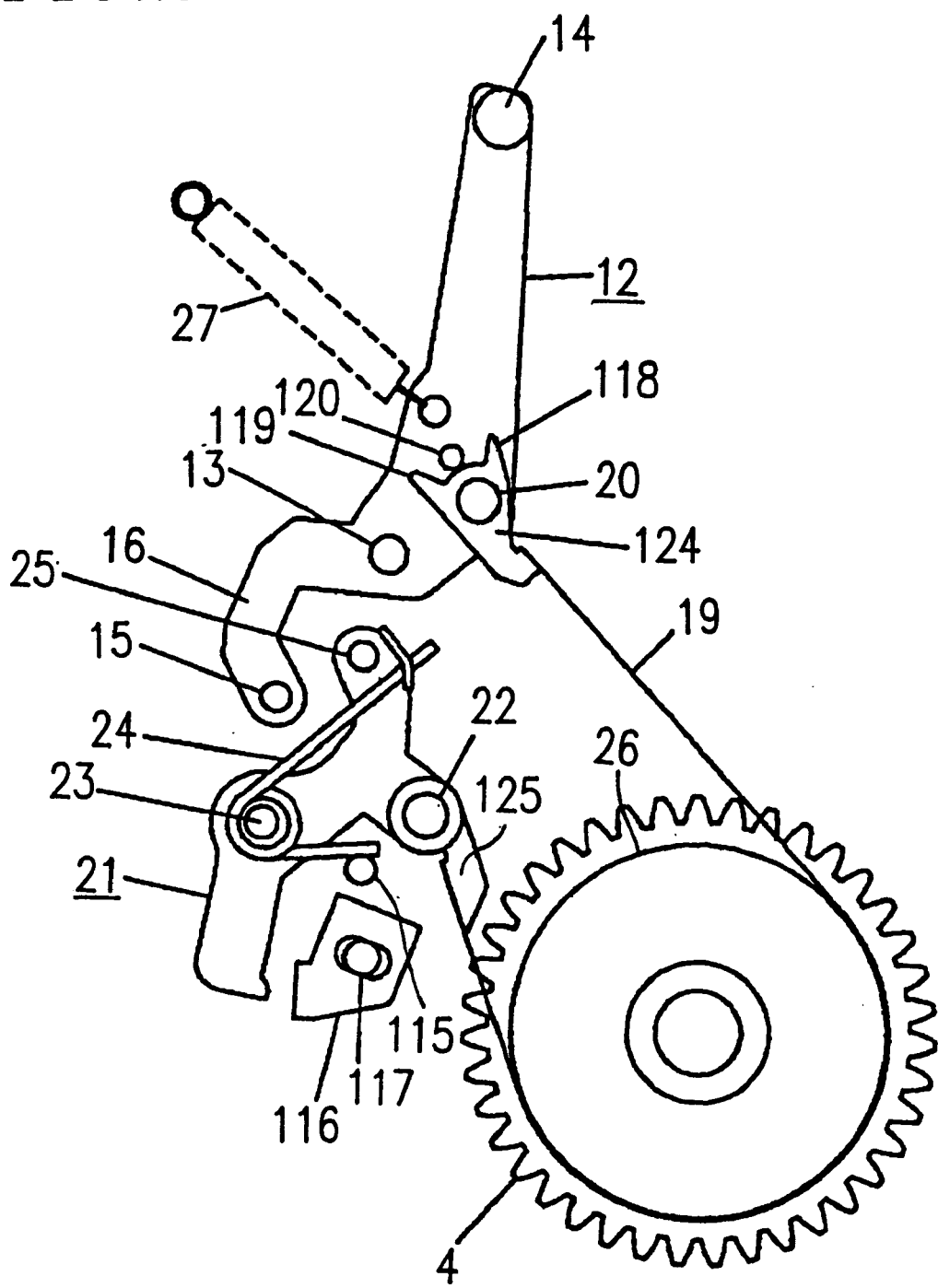
FIG. 2 is a plan view of a tension arm and components in the vicinity thereof of one embodiment of the magnetic recording/reproduction apparatus.

A tension arm 12 is swingably mounted on the sub-chassis 3 via a tension arm shaft 13. FIG. 2 shows a portion of the magnetic recording/reproduction apparatus in the vicinity of the tension arm 12 in detail. Referring to FIGS. 1 and 2, a tension post 14 is disposed at an end of the tension arm 12. A tension arm regulating pin 15 is provided at the other end 16 of the tension arm 12, which engages with a tension plate 18 (omitted in FIG. 1; see FIGS. 3 and 4) mounted on the main chassis 8 via a hole 17 formed through the sub-chassis 3 so as to regulate the movement of the tension arm 12.

A tension band 19 is swingably attached at one end 124 to a shaft 20 of the tension arm 12 and at the other end 125 to a shaft 22 of a tension band regulating arm 21. The tension band regulating arm 21 is swingably mounted on the sub-chassis 3 via a shaft 23, and urged counterclockwise by a torsion coil spring 24. The torsion coil spring 24 is hooked to a spring hook portion 115 disposed on the sub-chassis 3. A tension arm stop plate 116 is secured to the sub-chassis 3 with a screw (not shown) at a position 117 after being adjusted appropriately so that the movement of the tension band regulating arm 21 is restricted by abutting against the tension arm stop plate 116.

A pin 25 provided on the tension band regulating arm 21 engages with the tension plate 18 via the hole 17 of the sub-chassis 3 for restricting the movement of the tension band regulating arm 21. The tension band 19 passes around a cylinder portion 26 of the S reel base 4. The tension arm 12 is urged counterclockwise by a tension spring 27. An end of the tension spring 27 is hooked to a spring hook portion of the sub-chassis 3. In this embodiment, only outlines are shown by the broken lines for all tension springs throughout the drawings for simplification. The tension band 19 is provided with protrusions 118 and 119, while the tension arm 12 is provided with a band regulating protrusion 120.

The movement of the tension band 19 is regulated by the protrusions 118 and 119 abutting against the band regulating protrusion 120, so as to prevent the tension band 19 from slacking and thereby from displacing from the S reel base 4.

Referring to FIG. 1, a T4 arm 28 is swingably mounted on the sub-chassis 3 via a shaft 29. A T4 post 30 is disposed at one end of the T4 arm 28, and a T4 regulating pin 31 is provided at the other end thereof. The T4 arm 28 is urged counterclockwise by a spring (not shown).

Cam plates 32 and 33 are swingable right and left around pins 34 and 35, respectively, and secured to the sub-chassis 3 with screws (not shown) after positional adjustment.

Four elongate holes 36 provided through the sub-chassis 3 are engaged with four shafts 37 extending from the main chassis 8. The sub-chassis 3 is movable forward and backward along the elongate holes 36.

A cylinder 38 provided with a rotary magnetic head is mounted on the main chassis 8, and performs recording/reproduction of signals as the tape 2 passes around the cylinder 38.

An S boat 39 and a T boat 40 are provided with pins 41A and 41B, and pins 41C and 41D, respectively, which engage with an elongate hole 43 of a rail 42, so that the S boat 39 and the T boat 40 move along the elongate hole 43. The S boat 39 and the T boat 40 are also provided with an S1 post 45 and an S2 post 44 and a T1 post 46 and a T2 post 47, respectively, so that the tape 2 can be put in contact with the cylinder 38 as the S boat 39 and the T boat 40 move. A rail 48 and an S3 post 49 are disposed on the main chassis 8. A T3 post 51 is disposed in a capstan housing 52 which holds a capstan shaft 50. The capstan shaft 50 is driven by a capstan motor 50A.

A pinch arm 53 is swingably mounted on the main chassis 8 via a shaft 54. A pinch roller 55 is rotatably disposed at one end of the pinch arm 53. A pinch pressing arm 56 is also swingably attached to the shaft 54 of the pinch arm 53. The pinch pressing arm 56 and the pinch arm 53 are urged and held together by a torsion coil spring 57. A tension spring 58 extends between the pinch arm 53 and the sub-chassis 3, urging the pinch arm 53 counterclockwise. A protrusion 59 of the pinch arm 53 abuts against a wall 60 of the sub-chassis 3, so as to drive the pinch arm 53 as the sub-chassis 3 moves.

Figure 3:
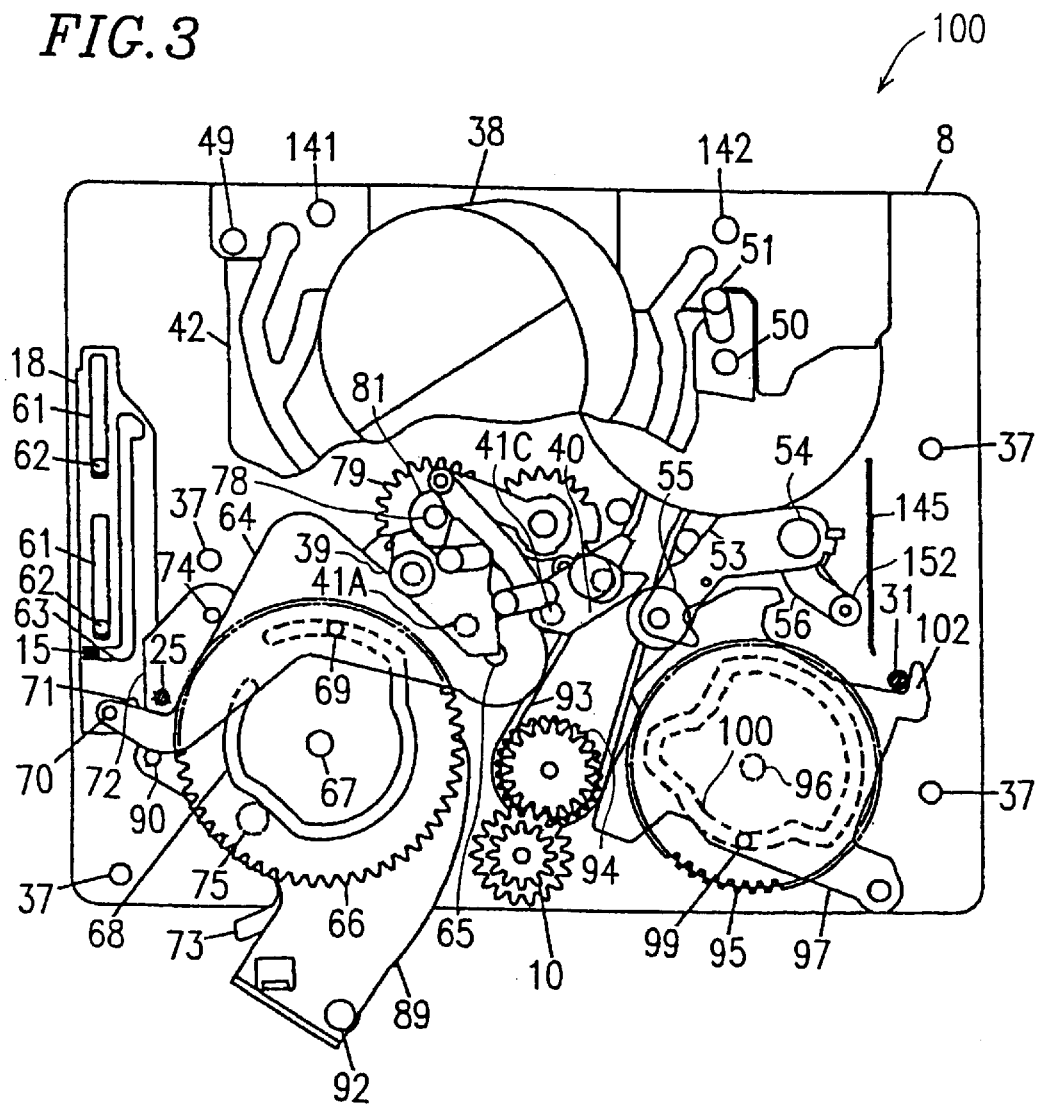
FIG. 3 is a plan view of one embodiment of the magnetic recording/reproduction apparatus in the UNLOADED mode, where a sub-chassis and components provided thereon are removed.

FIG. 3 is a plan view of the embodiment of the magnetic recording/reproduction apparatus according to the present invention in the UNLOADED mode, where the sub-chassis 3 together with the components provided thereon are removed for illustrating the structure of the main chassis 8.

Figure 4:
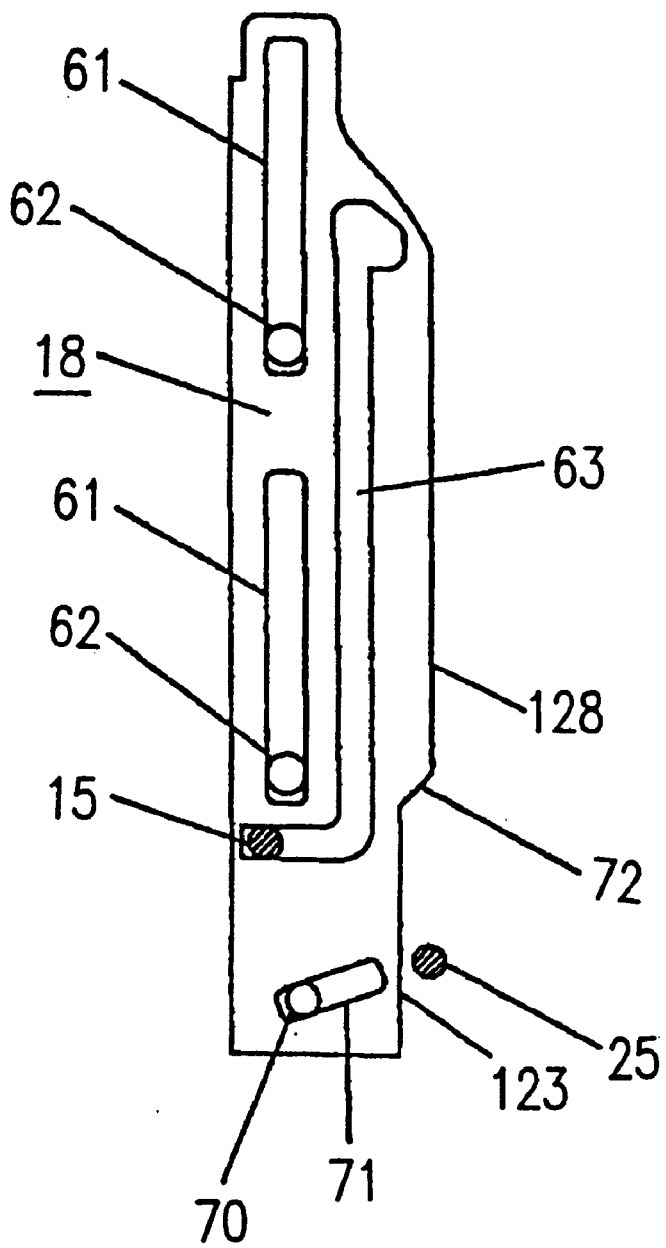
FIG. 4 is a plan view of a tension plate and components in the vicinity thereof of one embodiment of the magnetic recording/reproduction apparatus in the UNLOADED mode.

FIG. 4 shows the tension plate and components in the vicinity thereof in the UNLOADED mode in detail.

Referring to FIGS. 3 and 4, two elongate holes 61 formed through the tension plate 18 engage with two guide pins 62 extending from the main chassis 8, so that the tension plate 18 is guided forward and backward by the guide pins 62.

A cam groove 63 formed on the tension plate 18 engages with the tension arm regulating pin 15 described with reference to FIG. 1. A tension plate driving arm 64 is swingably mounted on the main chassis 8 via a shaft 65. A cam gear 66 is rotatably mounted on the main chassis 8 via a shaft 67. The cam gear 66 is provided with a cam groove 68 which engages with a cam following pin 69 extending from the tension plate driving arm 64. A pin 70 extending from the tension plate driving arm 64 engages with a cam groove 71 formed on the tension plate 18. The pin 25 extending from the tension band regulating arm 21 described with reference to FIG. 1 abuts against a cam 72 of the tension plate 18.

Referring to FIGS. 1, 3, and 4, the tension plate driving arm 64 is driven by the engagement of the cam following pin 69 with the cam groove 68 of the cam gear 66, and then the tension plate 18 is driven by the engagement of the cam groove 71 with the pin 70 of the tension plate driving arm 64.

The tension arm 12 is driven and the movement thereof is regulated by the engagement of the tension arm regulating pin 15 with the cam groove 63 of the tension plate 18. The tension band regulating arm 21 is driven and the movement thereof is regulated by the engagement of the pin 25 with the cam 72 of the tension plate 18.

Figure 5:
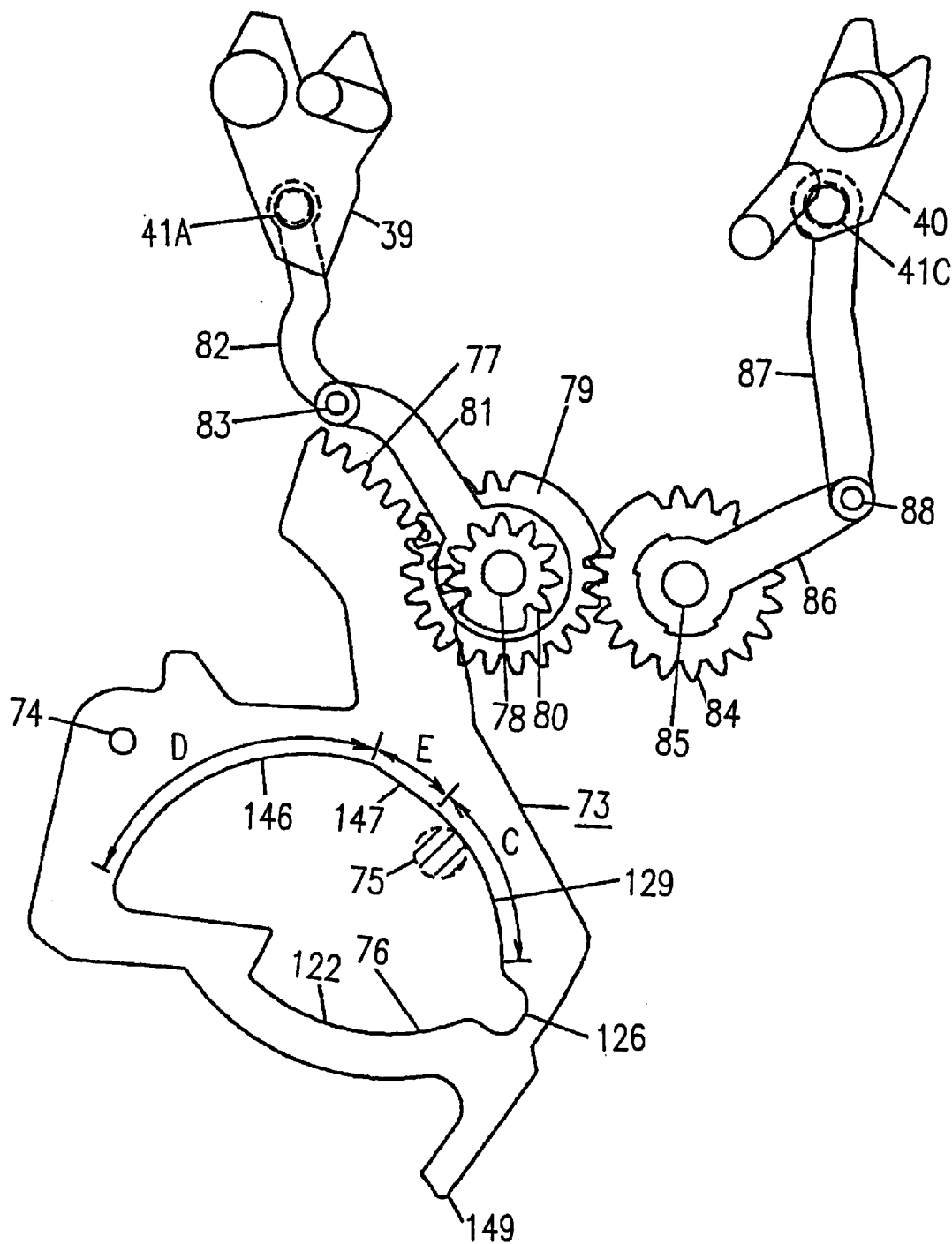
FIG. 5 is a view of a structure for driving an S boat and a T boat provided on a main chassis of one embodiment of the magnetic recording/reproduction apparatus.

FIG. 5 illustrates a mechanism for driving the S boat 39 and the T boat 40 mounted on the main chassis 8. Referring to FIGS. 3 and 5, a boat driving arm 73 is swingably mounted on the main chassis 8 via a shaft 74. A driving pin 75 extending from the cam gear 66 abuts against an internal cam 76 provided in the boat driving arm 73 so that the boat driving arm 73 is driven as the cam gear 66 swings.

A gear portion 77 of the boat driving arm 73 engages with a small gear portion 80 formed integrally with an S load gear 79 which is rotatably mounted on the main chassis 8 via a shaft 78.

An S load arm 81 is provided to swing coaxially with the S load gear 79. An S load link 82 is swingably coupled with the S load arm 81 and the S boat 39 via a shaft 83 and the pin 41A, respectively.

A T load gear 84 is rotatably mounted on the main chassis 8 via a shaft 85 and engages with the S load gear 79. A T load arm 86 is provided to swing coaxially with the T load gear 84. A T load link 87 is swingably coupled with the T load arm 86 and the T boat 40 via a shaft 88 and the pin 41C, respectively.

The S load arm 81 and the S load gear 79 are normally put together by means of a torsion coil spring (not shown) and swung around the shaft 78. When the S load gear 79 is rotated clockwise, the S load gear 79 is urged counterclockwise by the torsion coil spring (not shown). Likewise, the T load arm 86 and the T load gear 84 are normally put together by means of a torsion coil spring (not shown) and swung around the shaft 85. When the T load gear 84 is rotated counterclockwise while the T load arm 86 stands still, the T load gear 84 is urged clockwise by the torsion coil spring (not shown).

The S load gear 79 and the T load gear 84 are driven as the boat driving arm 73 swings, which causes the S boat 39 and the T boat 40 to move along the rail 42 via the movement of the S load link 82 and the T load link 87.

Figure 6:
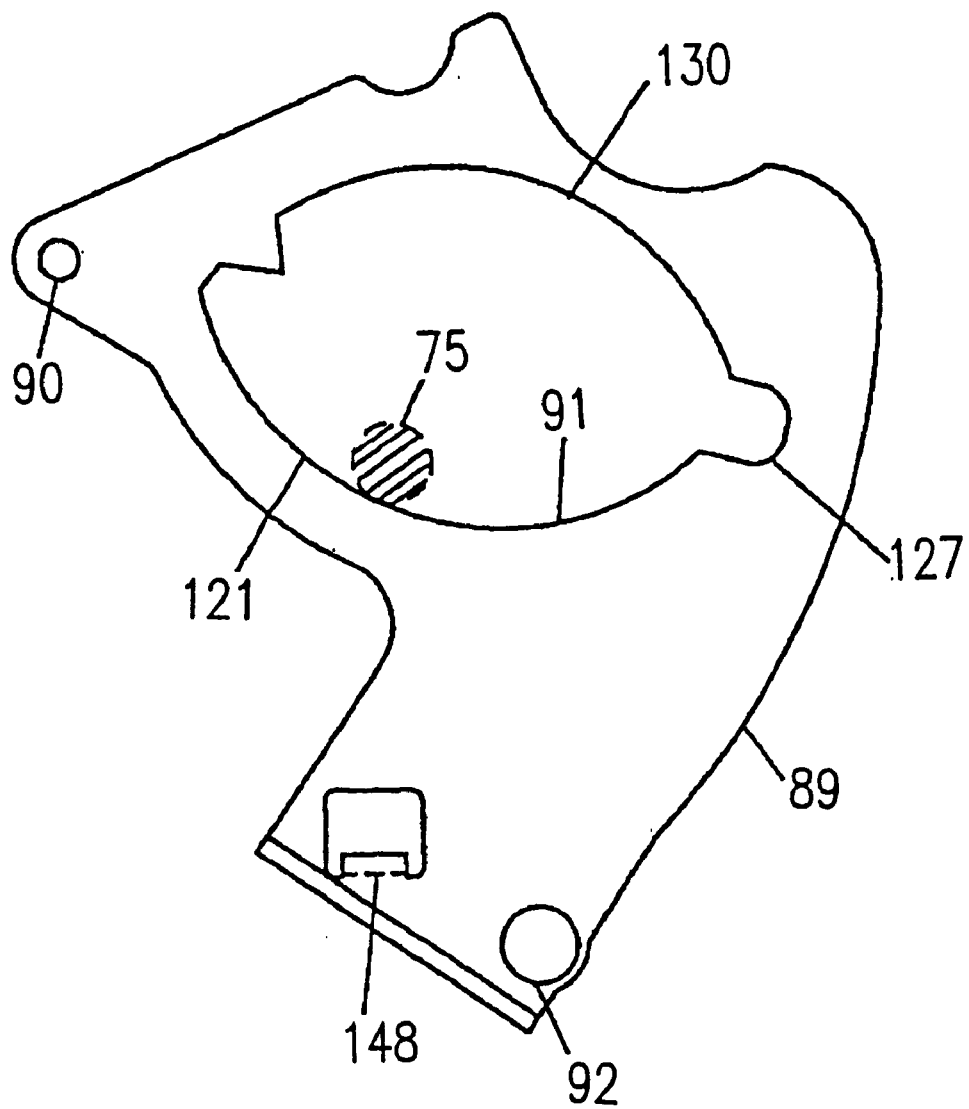
FIG. 6 is a view of a sub-chassis driving arm of one embodiment of the magnetic recording/reproduction apparatus.

FIG. 6 illustrates a sub-chassis driving arm 89 in detail. Referring to FIGS. 1, 3, and 6, the sub-chassis driving arm 89 is swingably mounted on the main chassis 8 via a shaft 90. The driving pin 75 extending from the cam gear 66 abuts against an internal cam 91 provided in the sub-chassis driving arm 89 so that the sub-chassis driving arm 89 is driven as the cam gear 66 swings, as in the case of the boat driving arm 73.

A guide pin 92 extends from the sub-chassis driving arm 89 and abuts against the cam plates 32 and 33 via a hole 108 in the sub-chassis 3 (see FIG. 1). Thus, the sub-chassis driving arm 89 is driven by the cam gear 66, and then the sub-chassis 3 is driven by the sub-chassis driving arm 89 via the cam plates 32 and 33. The position of the sub-chassis 3 with respect to the main chassis 8 can be adjusted by adjusting the positions of the cam plates 32 and 33 in the right and left directions.

Referring to FIG. 3, a timing belt 93 transmits the rotation of the capstan shaft 50 to a 2-stage gear 94 which is swingably mounted on the main chassis 8. The 2-stage gear 94 engages with the center gear 10. Thus, the rotation of the capstan shaft 50 is transmitted to the S reel base 4 and the T reel base 5 via the timing belt 93, the 2-stage gear 94, the center gear 10, and the idler gear 7.

Figure 7:
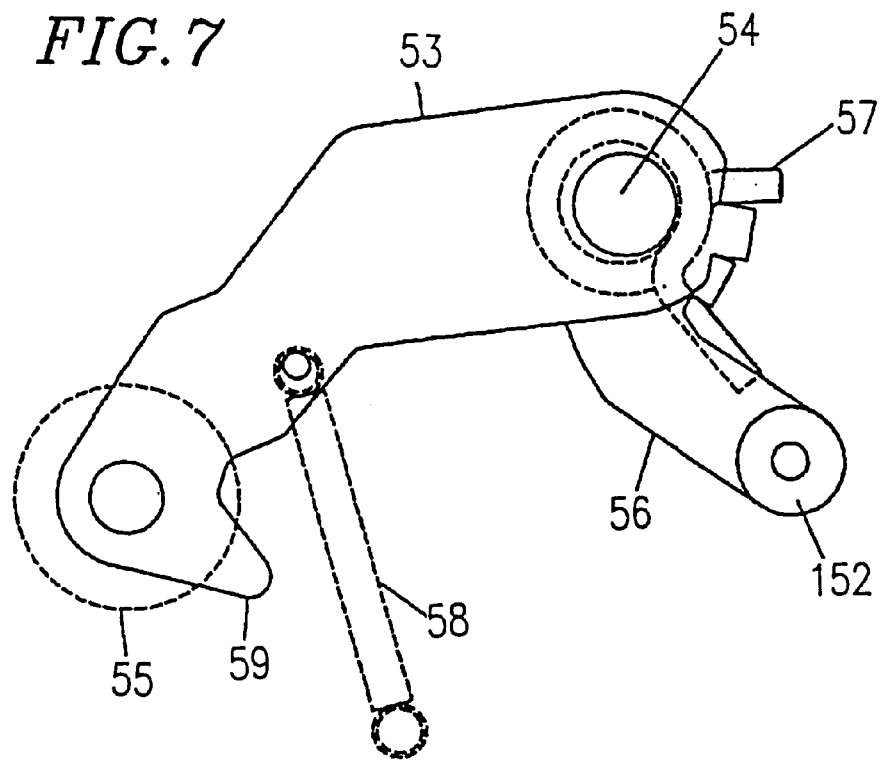
FIG. 7 is a view of a structure of a pinch arm and components in the vicinity thereof of one embodiment of the magnetic recording/reproduction apparatus.
Figure 8:
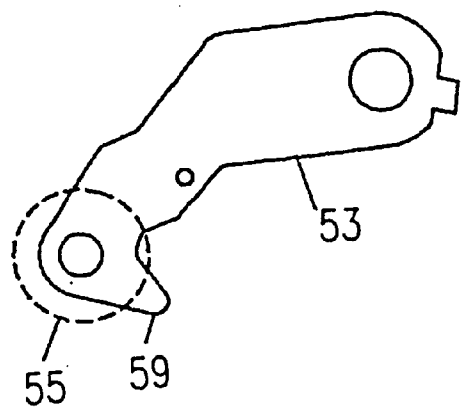
FIG. 8 is a view of the pinch arm of one embodiment of the magnetic recording/reproduction apparatus.
Figure 9:
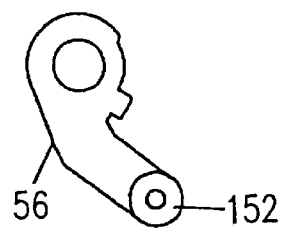
FIG. 9 is a view of a pinch pressing arm of one embodiment of the magnetic recording/reproduction apparatus.
Figure 10:
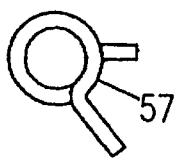
FIG. 10 is a view of a torsion coil spring of one embodiment of the magnetic recording/reproduction apparatus.

FIG. 7 illustrates a structure of the pinch arm 53 and the components in the vicinity thereof: FIG. 8 illustrates the pinch arm 53 itself, FIG. 9 illustrates the pinch pressing arm 56, and FIG. 10 illustrates the torsion coil spring 57. In FIGS. 7 and 8, only the outline is shown by the broken line for the pinch roller 55. As shown in FIG. 7, the pinch arm 53 and the pinch pressing arm 56 are normally swung integrally around the shaft 54 (see FIG. 1) by means of the torsion coil spring 57. When the pinch roller 55 abuts against the capstan shaft 50, the pinch arm 53 and the pinch pressing arm 56 stop swinging. In this state, when the pinch pressing arm 56 is further swung clockwise, the pinch roller 55 is pressed against the capstan shaft 50 by the repulsive force of the torsion coil spring 57. A roller 152 is rotatably attached to the pinch pressing arm 56.

Referring to FIG. 3, a pinch cam gear 95 is rotatably mounted on the main chassis 8 via a shaft 96. A pinch driving arm 97 is swingably mounted on the main chassis 8. A cam pin 99 extending from the pinch driving arm 97 engages with a cam groove 100 provided on the pinch cam gear 95, so that the pinch driving arm 97 is driven by the pinch cam gear 95.

Referring to FIGS. 1 and 3, the T4 regulating pin 31 of the T4 arm 28 abuts against a protrusion 102 of the pinch driving arm 97 via a hole 101 (FIG. 1) formed through the sub-chassis 3. The T4 arm 28 is therefore driven by the swinging of the pinch driving arm 97.

Figure 11:
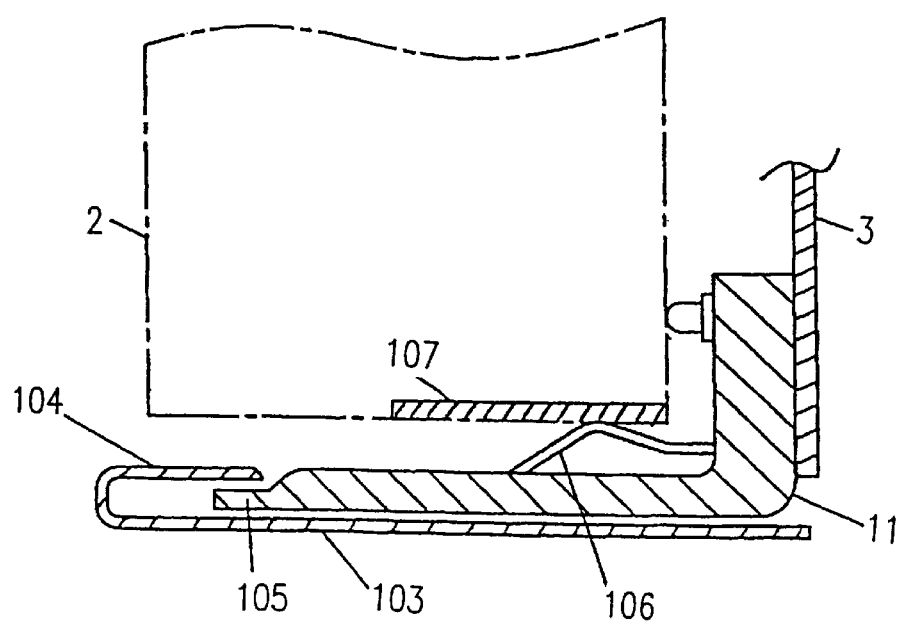
FIG. 11 is a cross-sectional view of a MIC-SW of one embodiment of the magnetic recording/reproduction apparatus, taken along line A—A of FIG. 1.

FIG. 11 is a cross-sectional view of the MIC-SW 11, taken along line A—A of FIG. 1. Referring to FIGS. 1 and 11, the MIC-SW 11 is secured to the sub-chassis 3 with a screw (not shown). A sub-chassis reinforcing plate 103 is secured to the sub-chassis 3 with a screw (not shown). A U-shaped end portion 104 of the sub-chassis reinforcing plate 103 engages with an end 105 of the MIC-SW 11 so as to reinforce the MIC-SW 11. The MIC-SW 11 is provided with a contact 106 which comes into contact with a memory 107 located in the cassette 2 for effecting output/input of signals. When the contact 106 is pressed by the cassette 2, the MIC-SW 11 receives a reactive force. Since the body of the MIC-SW 11 is normally made of plastic, it is vulnerable to creep deformation. According to the present invention, however, the MIC-SW 11 can be reinforced by the sub-chassis reinforcing plate 103, allowing the body of the MIC-SW 11 to be thinned and thereby the entire apparatus to be made small.

Figure 12:
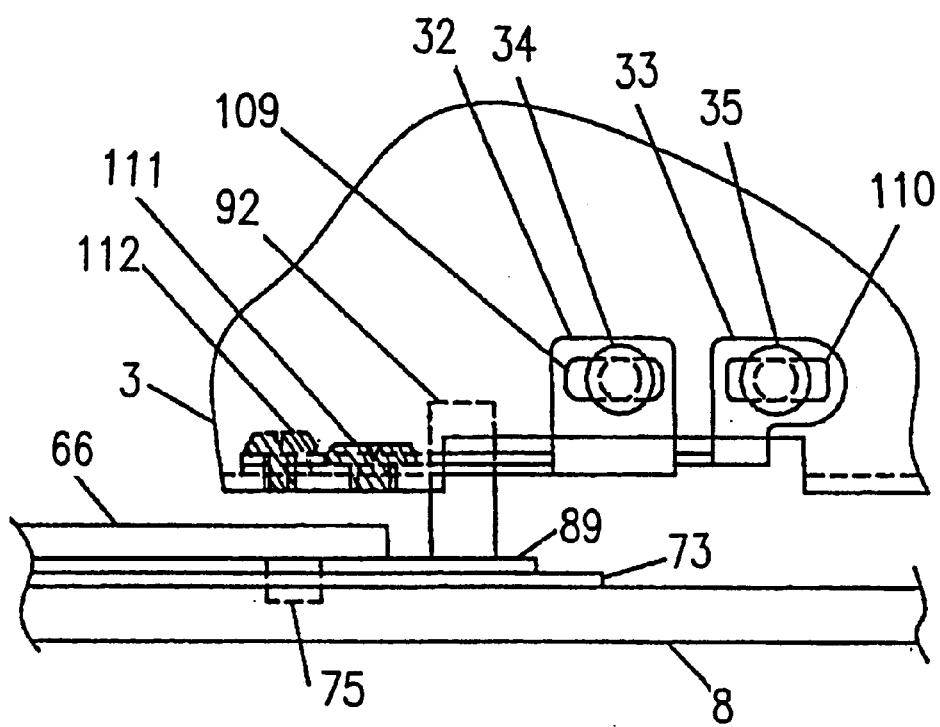
FIG. 12 is a view of one embodiment of the magnetic recording/reproduction apparatus, viewed in the direction shown by arrow B in FIG. 1.

FIG. 12 is a view as is seen in the direction indicated by arrow B in FIG. 1. Referring to FIGS. 1 and 12, the boat driving arm 73 and the sub-chassis driving arm 89 are driven by the driving pin 75 extending from the cam gear 66 mounted on the main chassis 8. Elongate holes 109 and 110 are formed through the cam plates 32 and 33, and enable the cam plates 32 and 33 to be held movably in the right and left directions with respect to the sub-chassis 3. Screws 111 and 112 (not shown in FIG. 1) secure the cam plates 32 and 33 at positions 113 and 114 shown in FIG. 1, respectively, after positional adjustment of the cam plates 32 and 33 by guiding the cam plates in the right and left directions with respect to the sub-chassis 3.

FIGS. 13 through 17 are plan views of the magnetic recording/reproduction apparatus of this embodiment, illustrating respective states of the apparatus in order after the state in which the cassette can be placed/removed (UNLOADED mode) shown in FIG. 1 until the tape recording/reproduction mode. All of the reference numerals of the components shown in FIGS. 13 through 17 correspond to those shown in FIG. 1.

Figure 13:
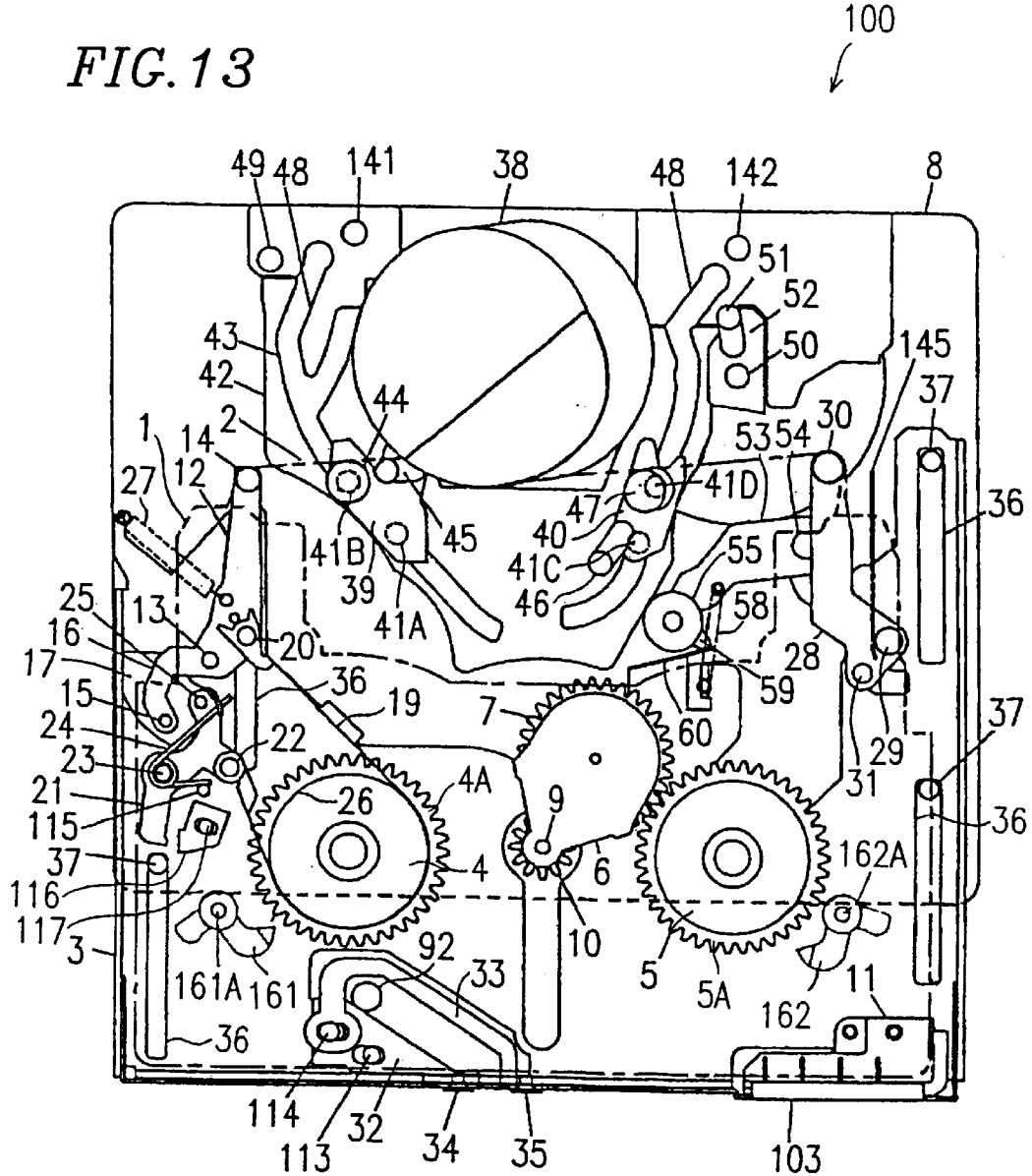
FIG. 13 is a plan view of one embodiment of the magnetic recording/reproduction apparatus, illustrating a state in which a tension post and a T4 post have protruded (LOADING 1 mode)
Figure 14:
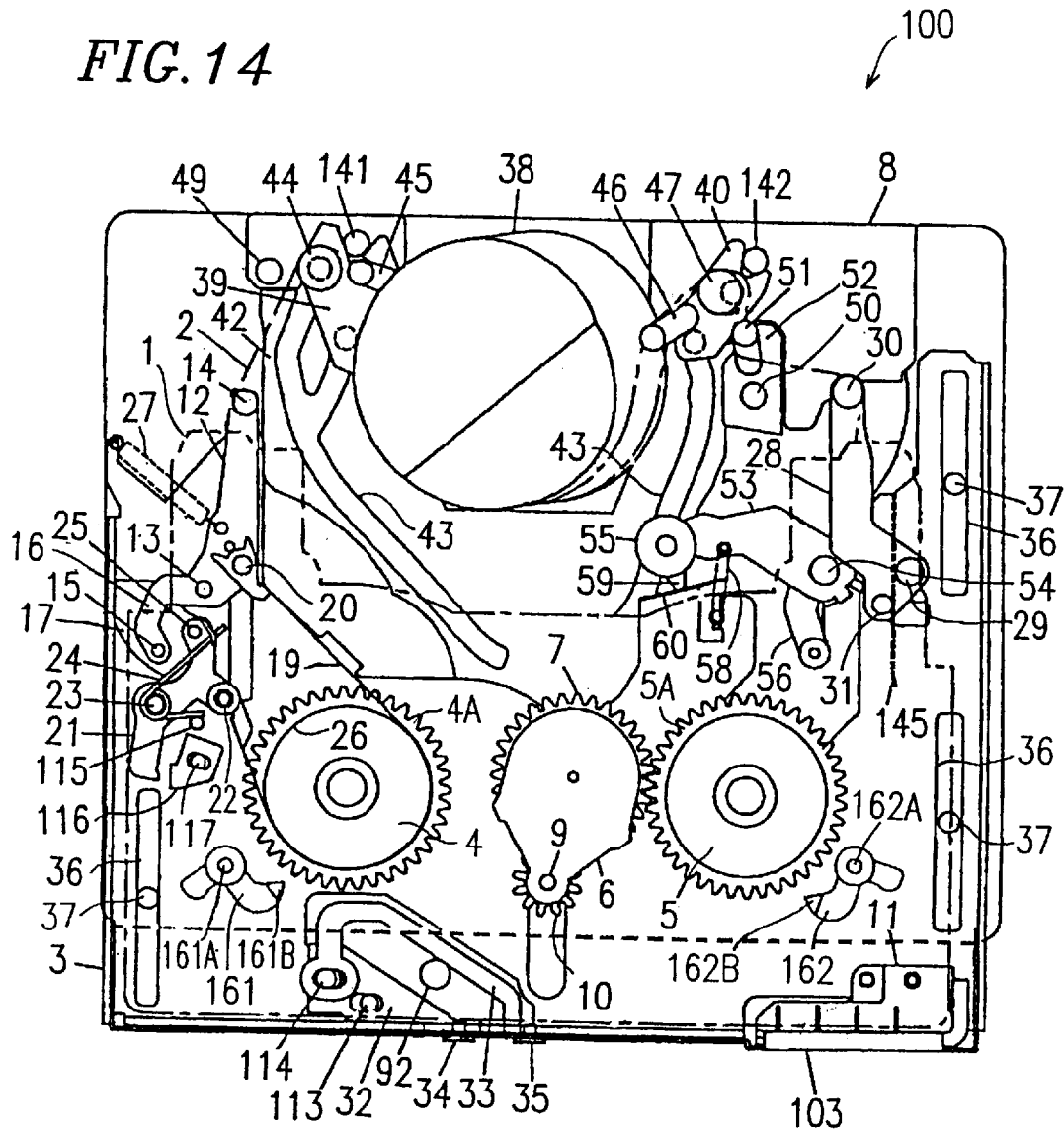
FIG. 14 is a plan view of one embodiment of the magnetic recording/reproduction apparatus, illustrating a state in which the sub-chassis has moved by a half of the entire stroke (LOADING 2 mode)
Figure 15:
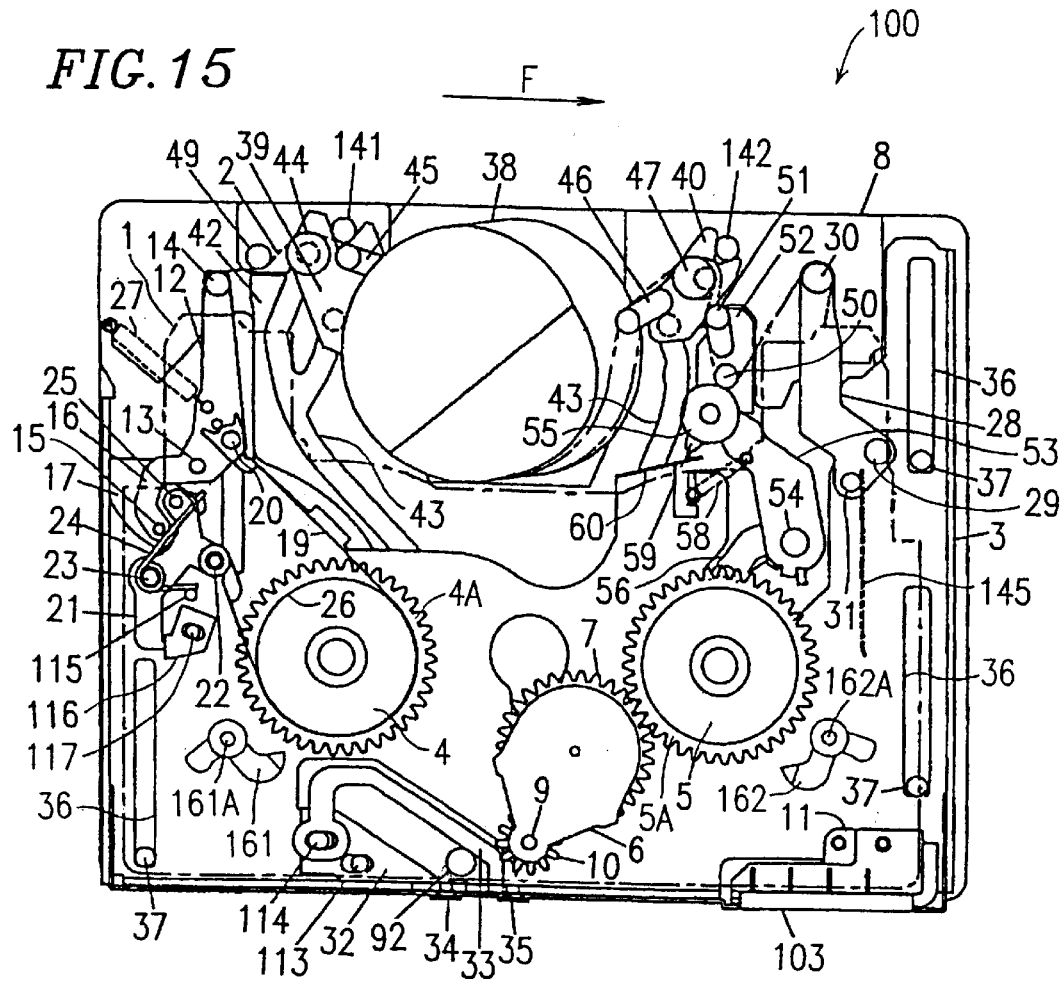
FIG. 15 is a plan view of one embodiment of the magnetic recording/reproduction apparatus, illustrating a state in which the apparatus is ready for recording/reproduction and fast-forwarding of a tape (PLAY mode)

FIG. 13 illustrates LOADING 1 mode in which the tension post 14 and the T4 post 30 have protruded from the cassette 1. FIG. 14 illustrates LOADING 2 mode in which the sub-chassis 3 has moved a half of its entire stroke. FIG. 15 illustrates PLAY mode in which the movement of the sub-chassis 3 has been completed and the tape loading, i.e., the passing of the tape 2 around the cylinder 38, has been completed, to allow the tape to run forward from the S reel base 4 to the T reel base 5 to effect recording/reproduction, fast-forwarding, etc. of the tape.

Figure 16:
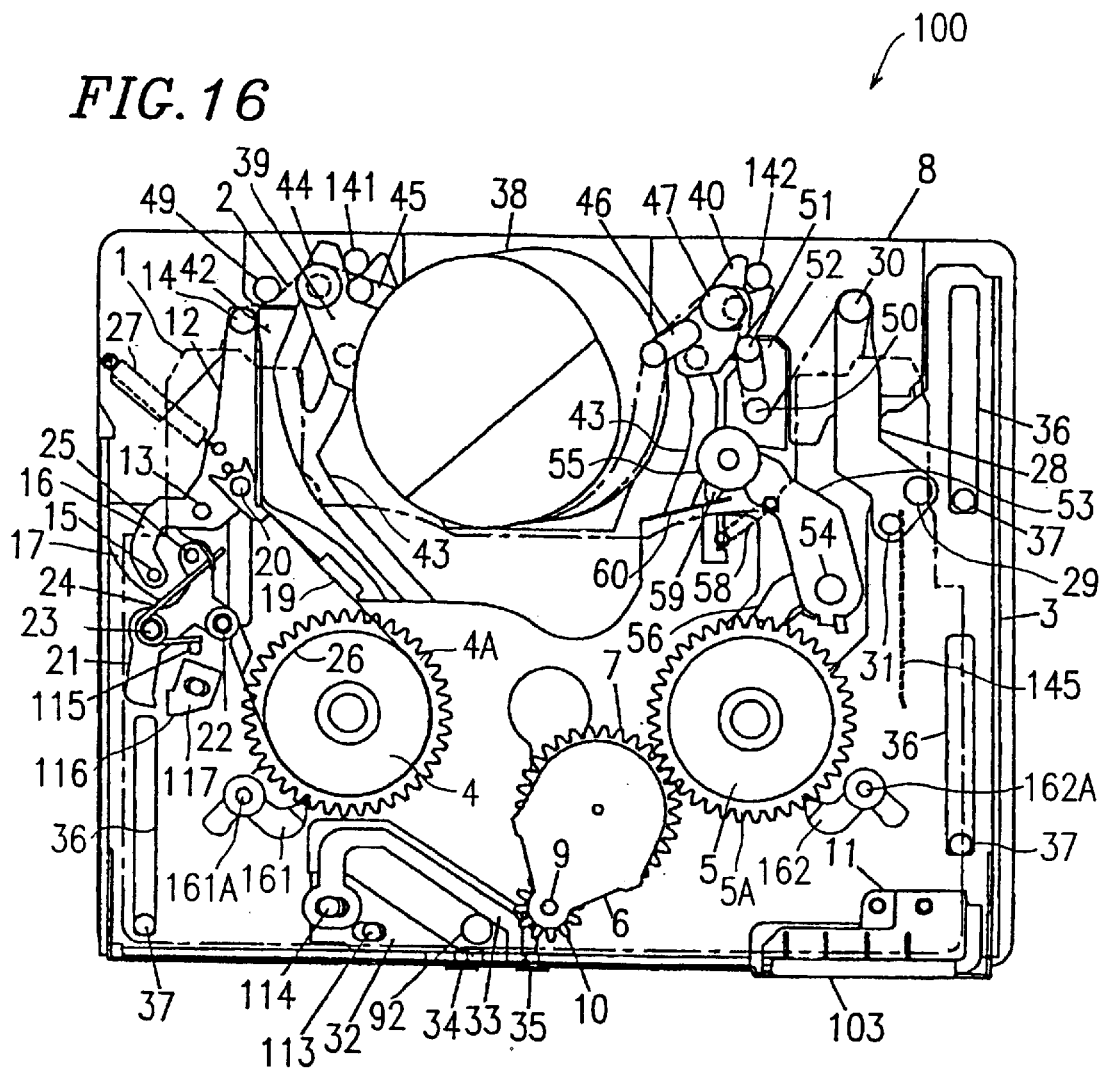
FIG. 16 is a plan view of one embodiment of the magnetic recording/reproduction apparatus, illustrating a state in which the tape running is not performed (STOP mode)
Figure 17:
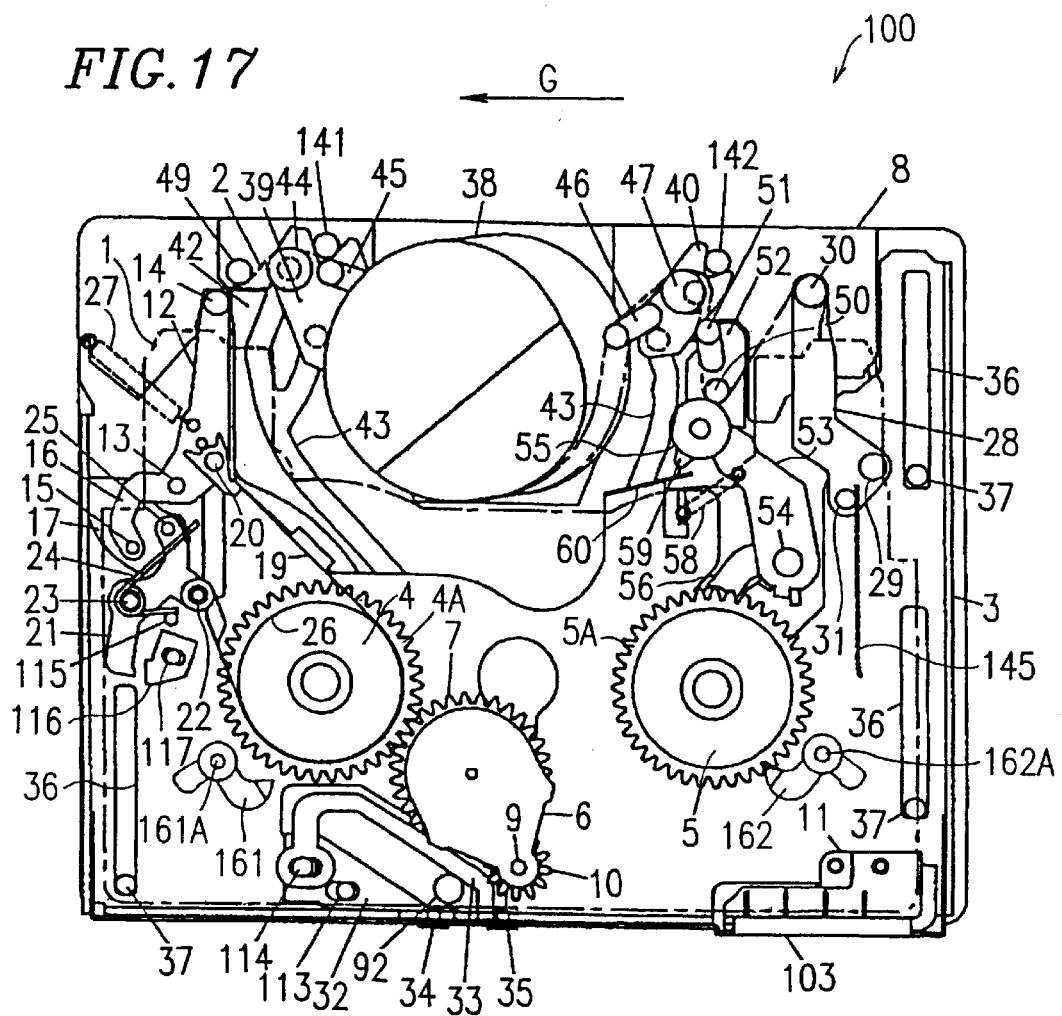
FIG. 17 is a plan view of one embodiment of the magnetic recording/reproduction apparatus, illustrating a state in which the apparatus is ready for reverse reproduction and rewinding of a tape (REV mode)

FIG. 16 illustrates STOP mode in which the running of the tape is stopped. FIG. 17 illustrates REV mode in which the tape runs reverse to the direction in the PLAY mode to effect reverse reproduction, rewinding, etc. of the tape.

Figure 18:
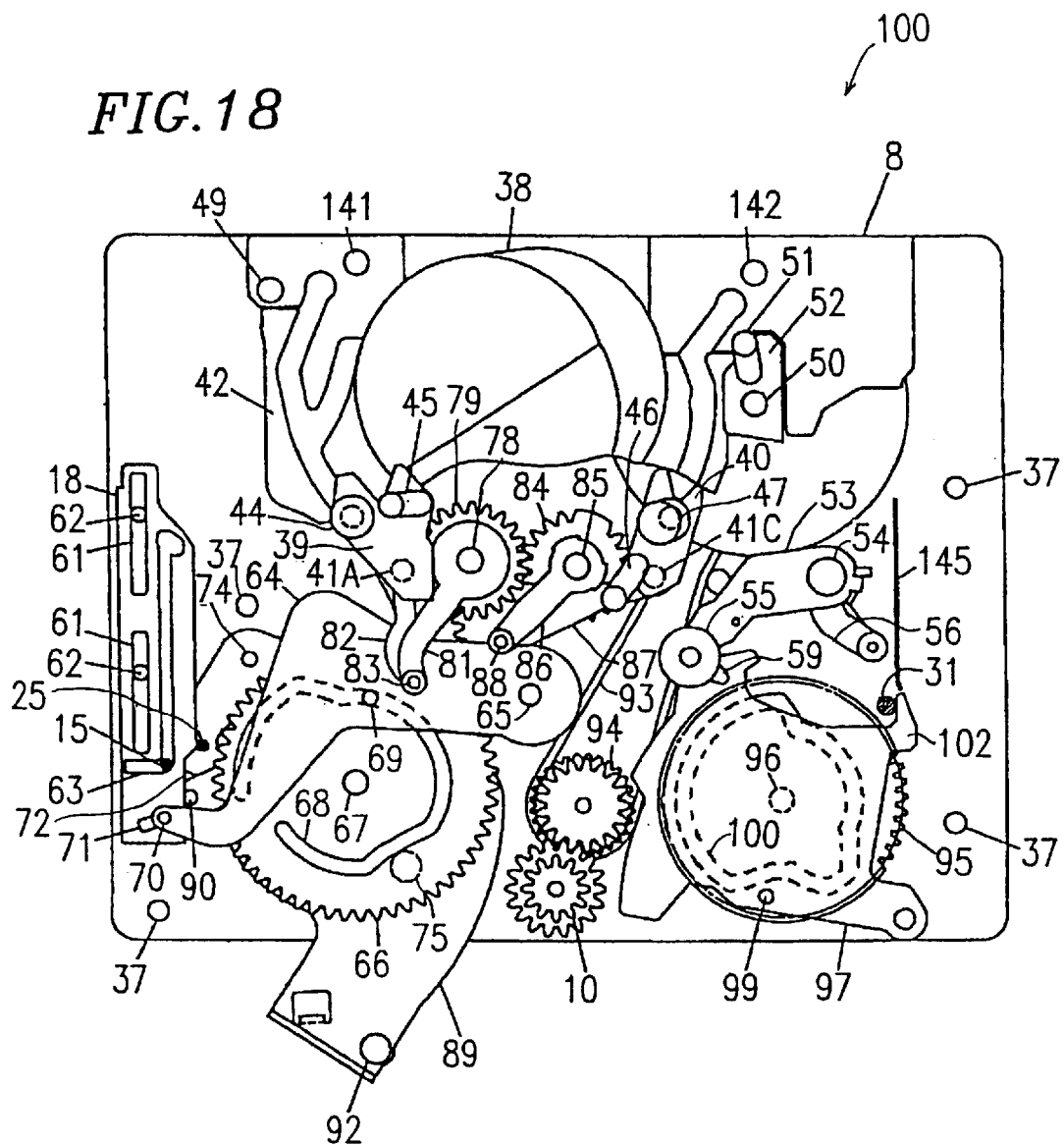
FIG. 18 is a plan view of one embodiment of the magnetic recording/reproduction apparatus in the LOADING 1 mode, where the sub-chassis and components provided thereon are removed.
Figure 19:
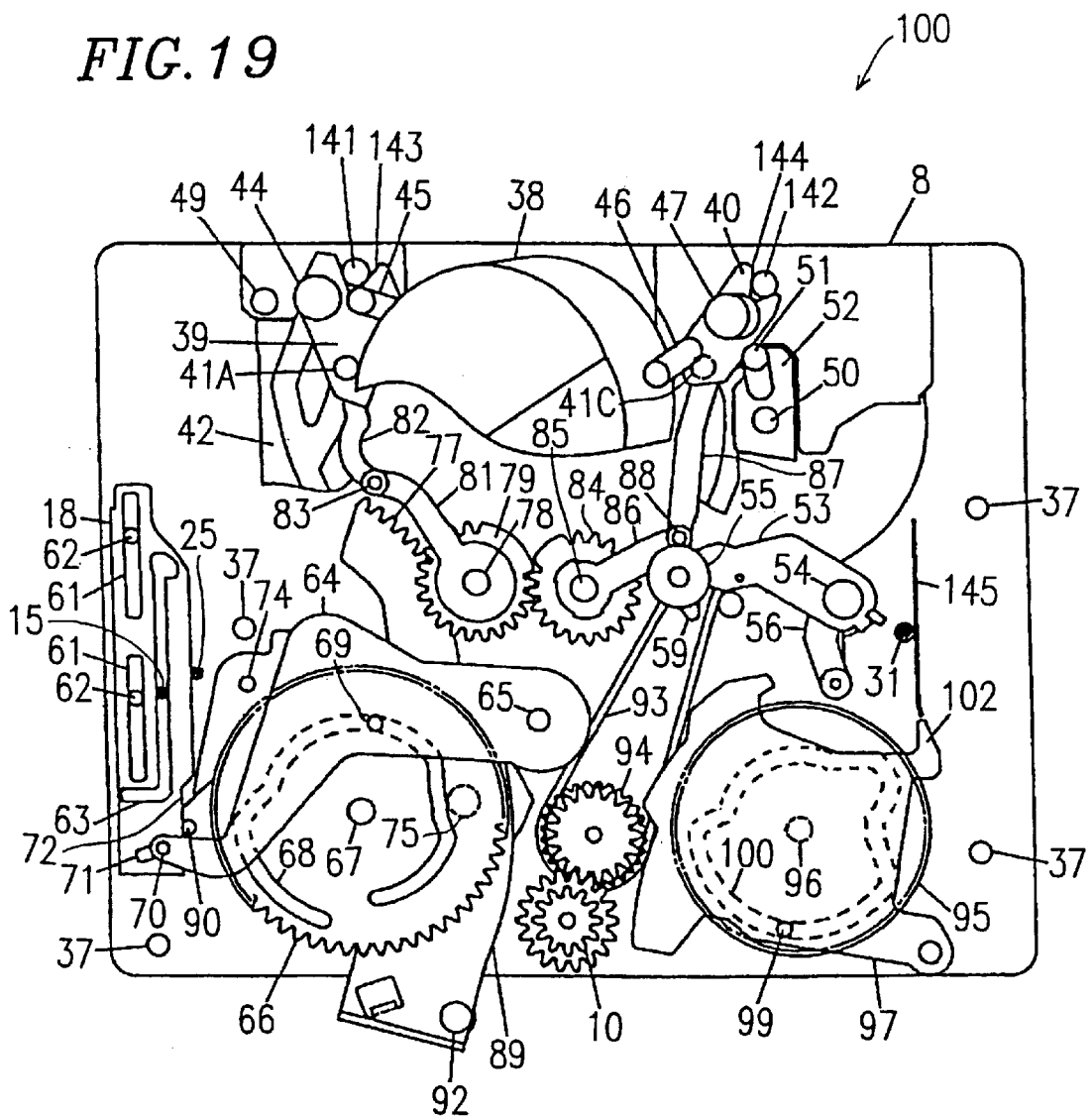
FIG. 19 is a plan view of one embodiment of the magnetic recording/reproduction apparatus in the LOADING 2 mode, where the sub-chassis and components provided thereon are removed.

FIGS. 18 and 19 are views similar to FIG. 3, i.e., plan views of the magnetic recording/reproduction apparatus 100 according to the present invention, where the sub-chassis 3 together with the components provided thereon are removed for illustrating the structure of the main chassis 8. All of the reference numerals of the components shown in FIGS. 18 and 19 correspond to those shown in FIG. 3. FIGS. 3, 18, and 19 illustrate the UNLOADED mode, the LOADING 1 mode, and the LOADING 2 mode, respectively.

Figure 20:
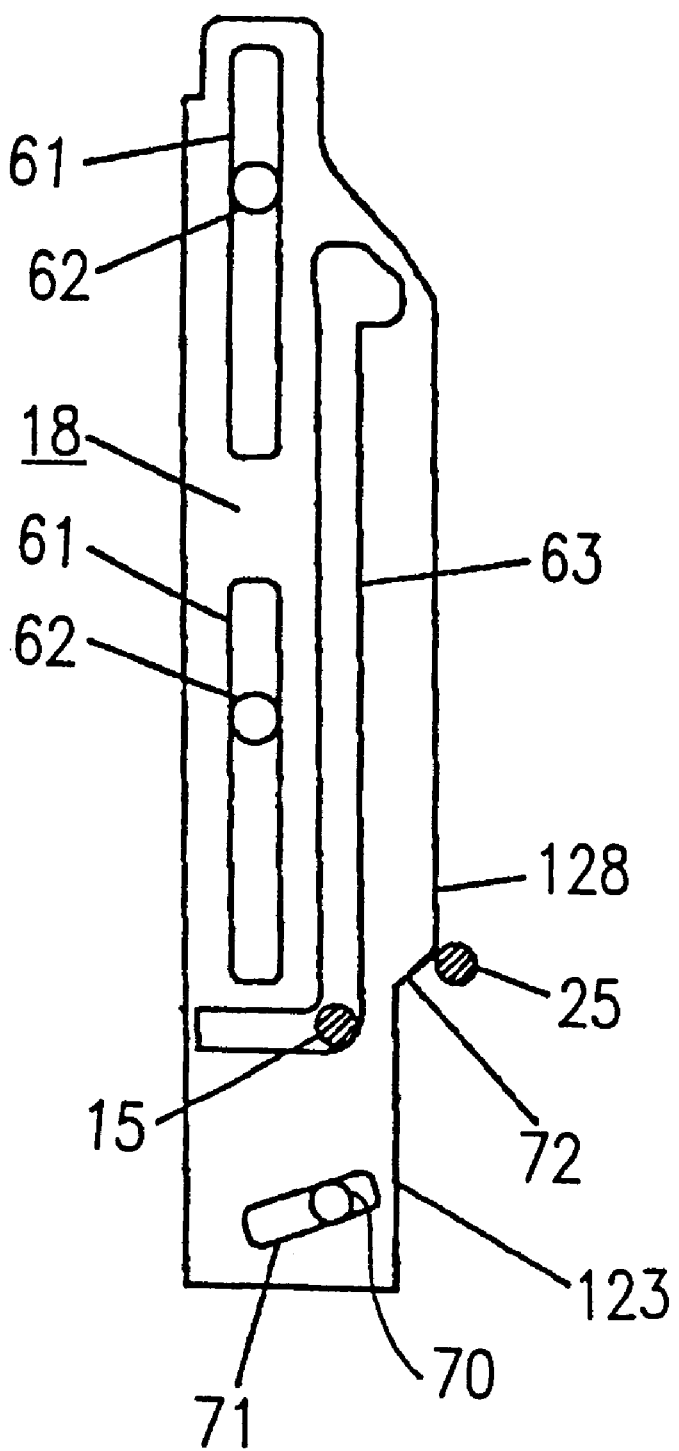
FIG. 20 is a plan view of the tension plate and components in the vicinity thereof of one embodiment of the magnetic recording/reproduction apparatus in the LOADING 1 mode.
Figure 21:
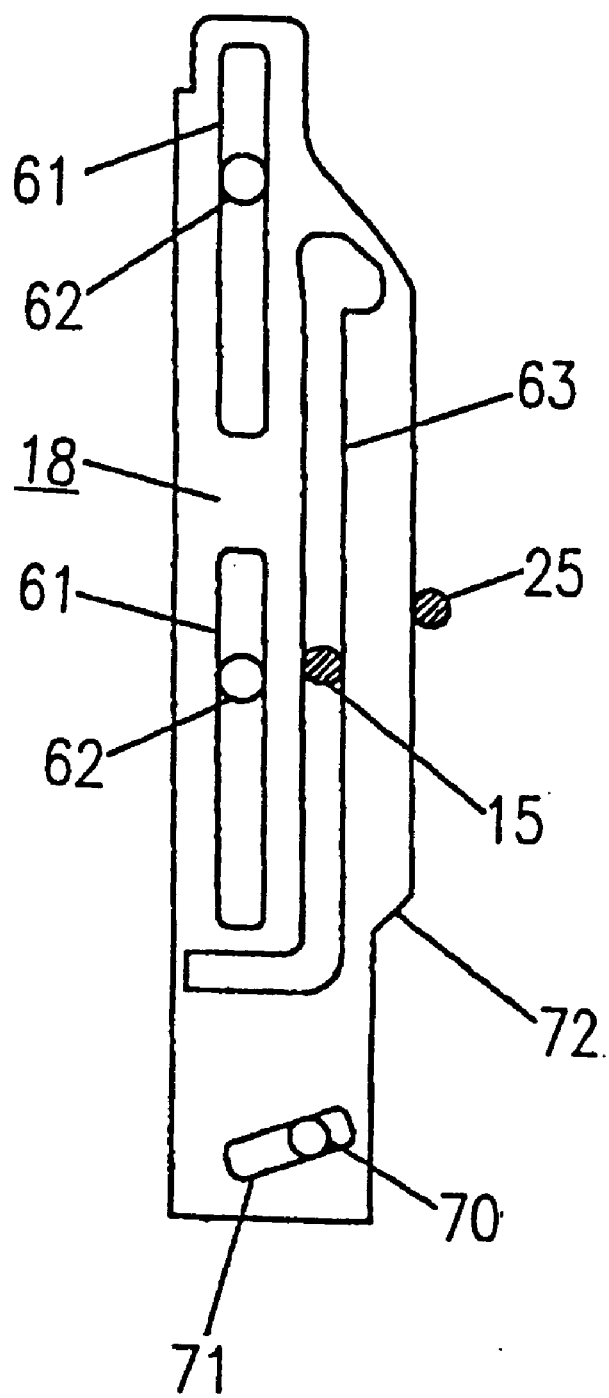
FIG. 21 is a plan view of the tension plate and components in the vicinity thereof of one embodiment of the magnetic recording/reproduction apparatus in the LOADING 2 mode.
Figure 22:
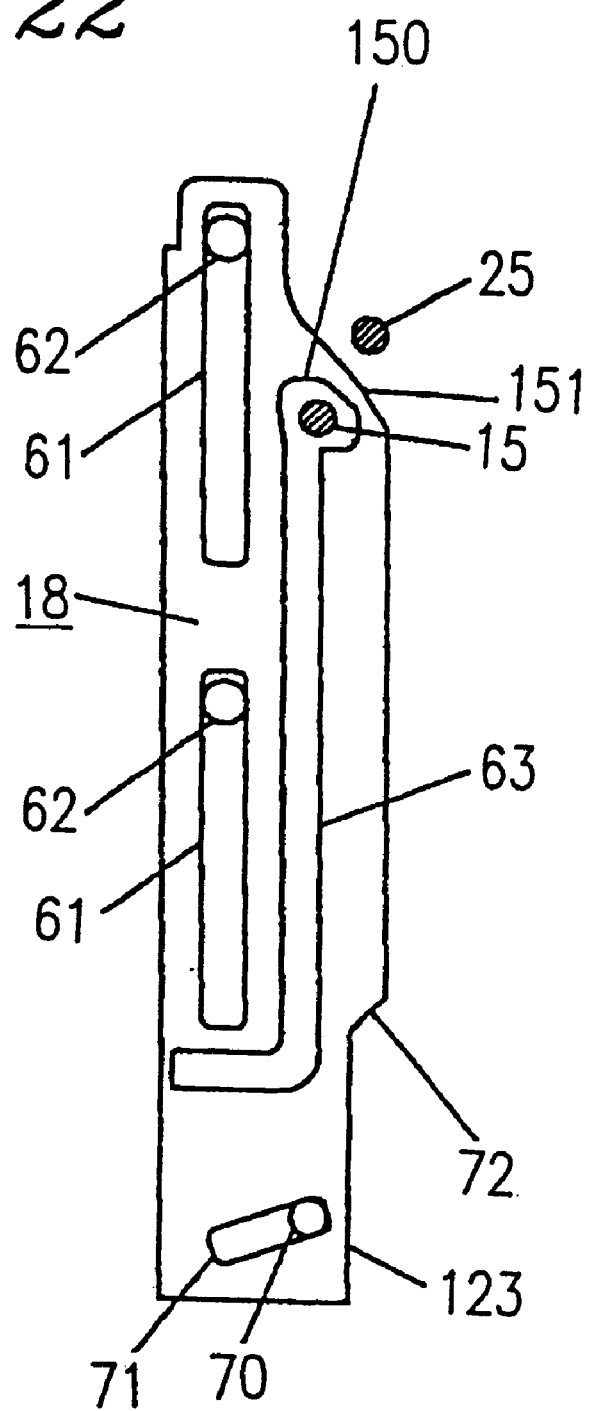
FIG. 22 is a plan view of the tension plate and components in the vicinity thereof of one embodiment of the magnetic recording/reproduction apparatus in the PLAY mode.
Figure 23:
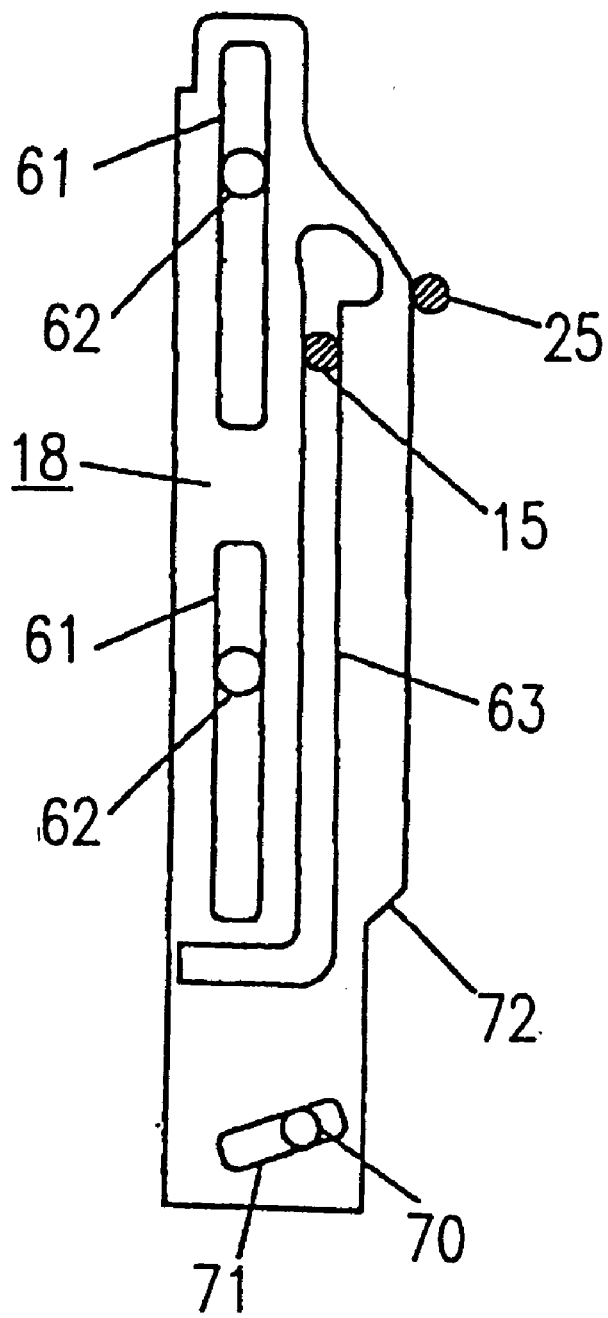
FIG. 23 is a plan view of the tension plate and components in the vicinity thereof of one embodiment of the magnetic recording/reproduction apparatus in the STOP mode and the REV mode.

FIGS. 20 through 23 are views similar to FIG. 4, i.e., views illustrating the tension plate 18 and the components in the vicinity thereof in detail. All of the reference numerals of the components shown in FIGS. 20 to 23 correspond to those shown in FIG. 4. FIG. 4 illustrates the UNLOADED mode, FIG. 20 illustrates the LOADING 1 mode, FIG. 21 illustrates the LOADING 2 mode, FIG. 22 illustrates the PLAY mode, and FIG. 23 illustrates the STOP mode and the REV mode. The position of the tension plate 18 is the same in the STOP mode and the REV mode.

FIGS. 24 through 30 are views illustrating the state in which the boat driving arm 73 and the sub-chassis driving arm 89 are driven by the driving pin 75 extending from the cam gear 66.

Figure 24:
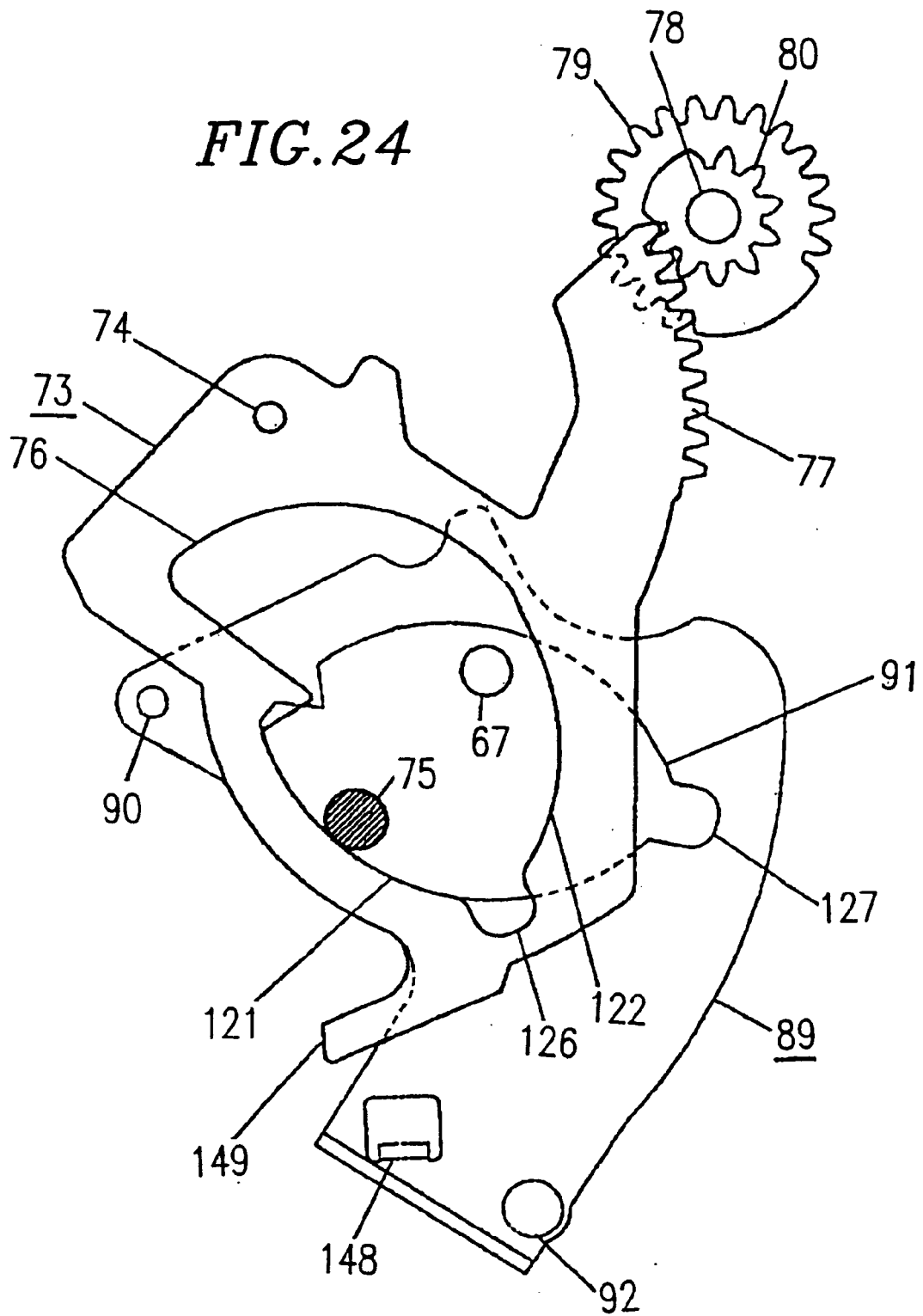
FIG. 24 is a plan view illustrating a state in which a boat driving arm and a sub-chassis driving arm are driven in the UNLOADED mode in one embodiment of the magnetic recording/reproduction apparatus.
Figure 25:
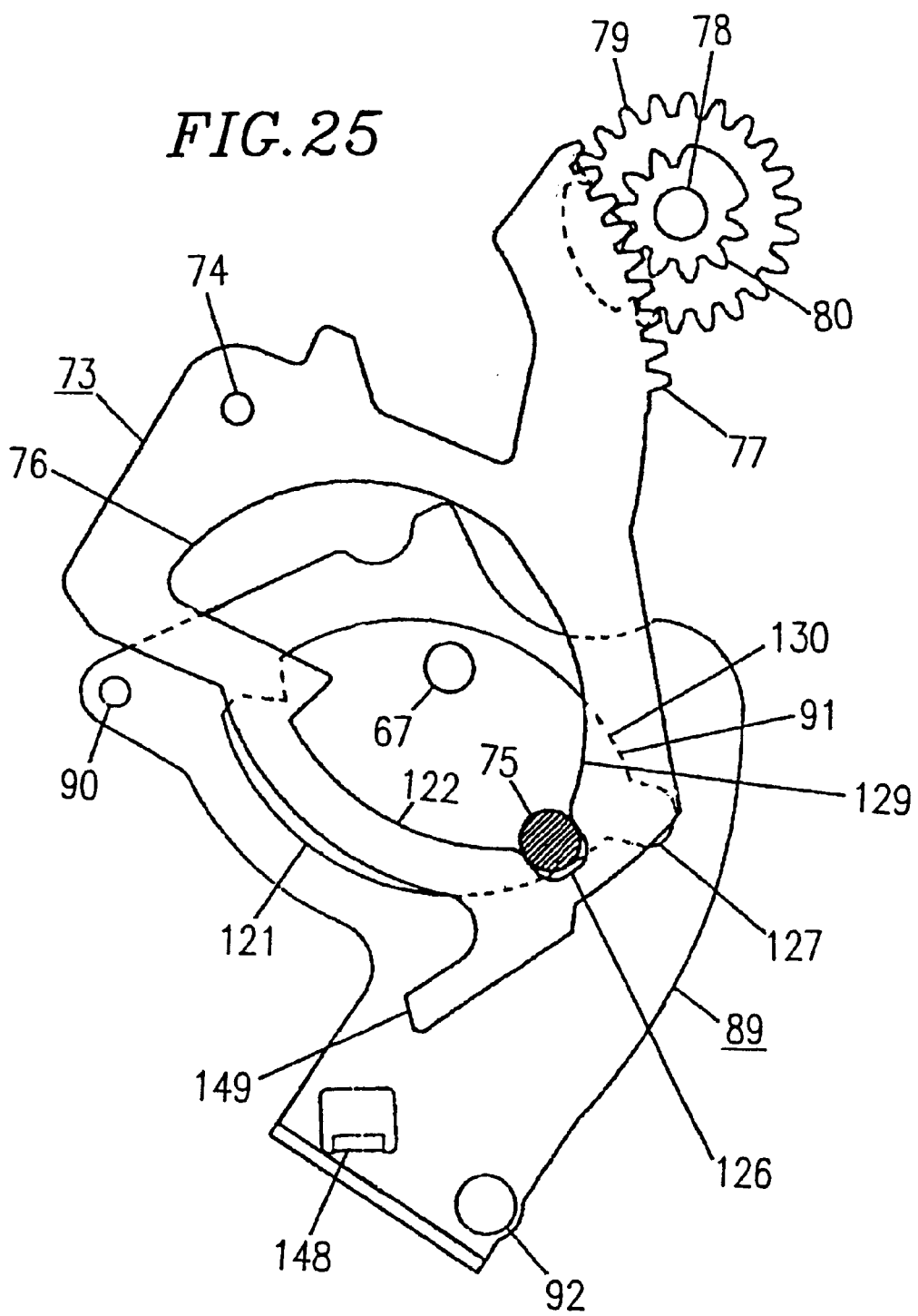
FIG. 25 is a plan view illustrating a state in which the boat driving arm and the sub-chassis driving arm are driven in the LOADING 1 mode in one embodiment of the magnetic recording/reproduction apparatus.
Figure 26:
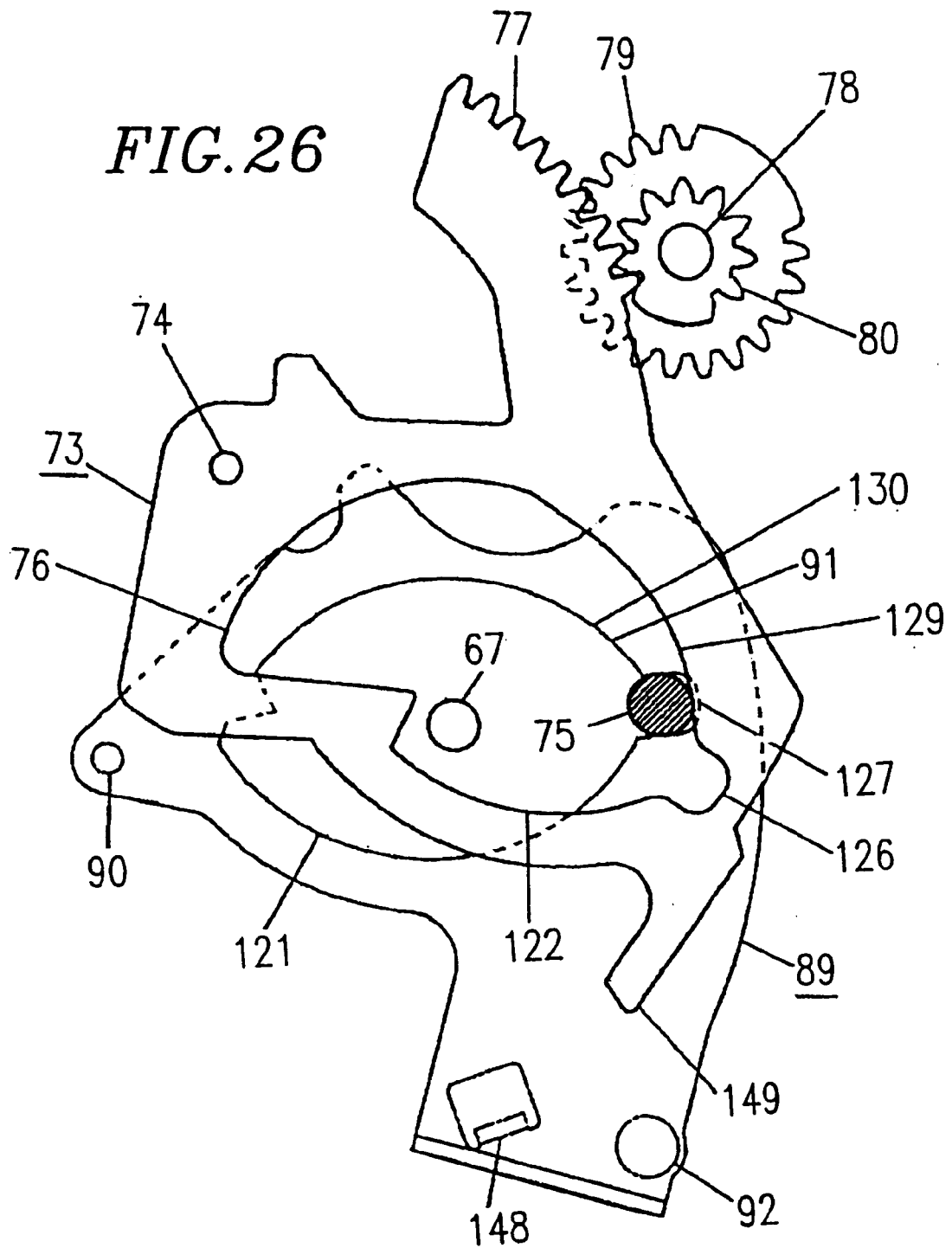
FIG. 26 is a plan view illustrating a state in which the boat driving arm and the sub-chassis driving arm are driven in the LOADING 2 mode in one embodiment of the magnetic recording/reproduction apparatus.
Figure 27:
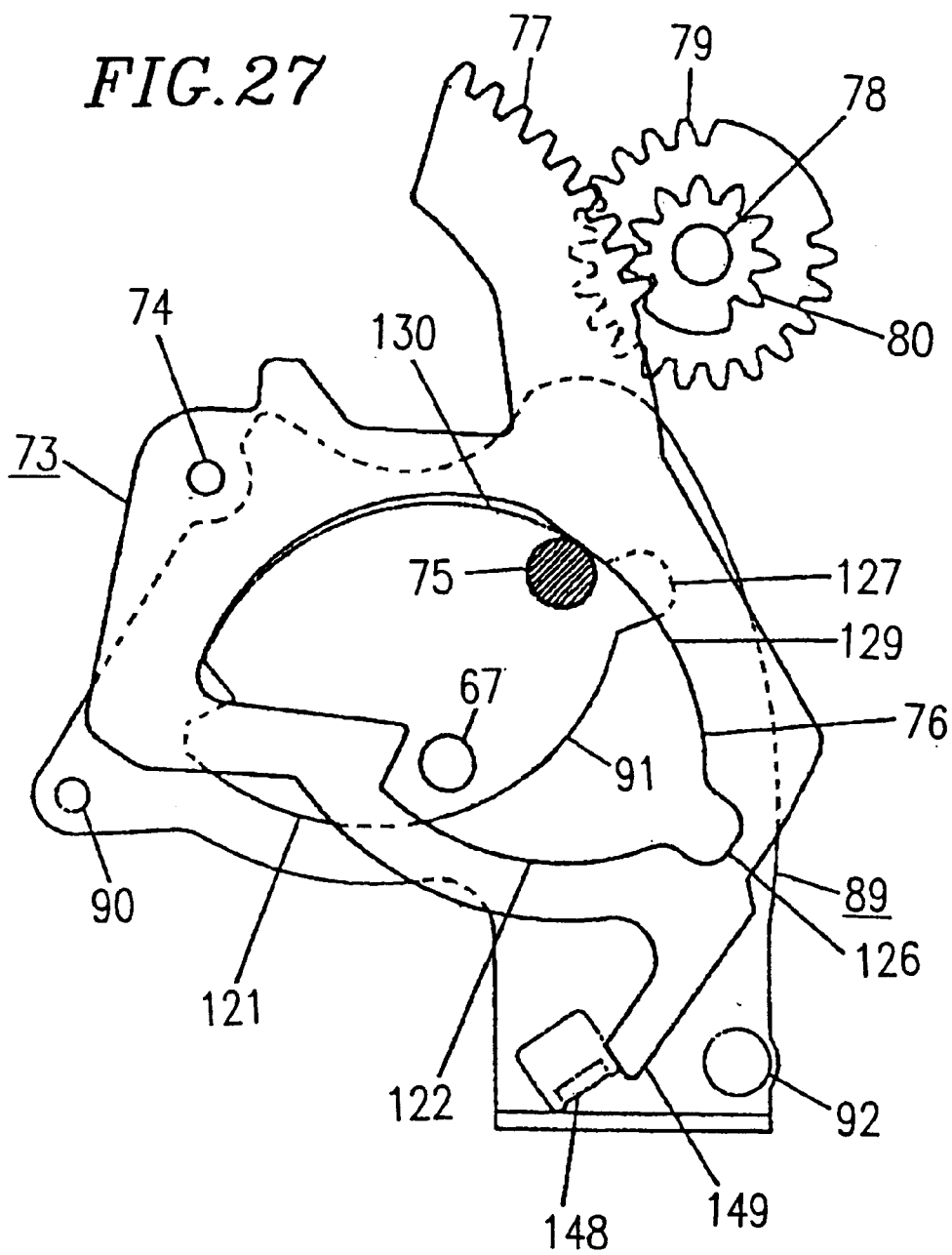
FIG. 27 is a plan view illustrating a state in which the boat driving arm and the sub-chassis driving arm are driven in a mode which is a mode before the PLAY mode and close to the LOADING 2 mode (PRE-PLAY mode) in one embodiment of the magnetic recording/reproduction apparatus.
Figure 28:
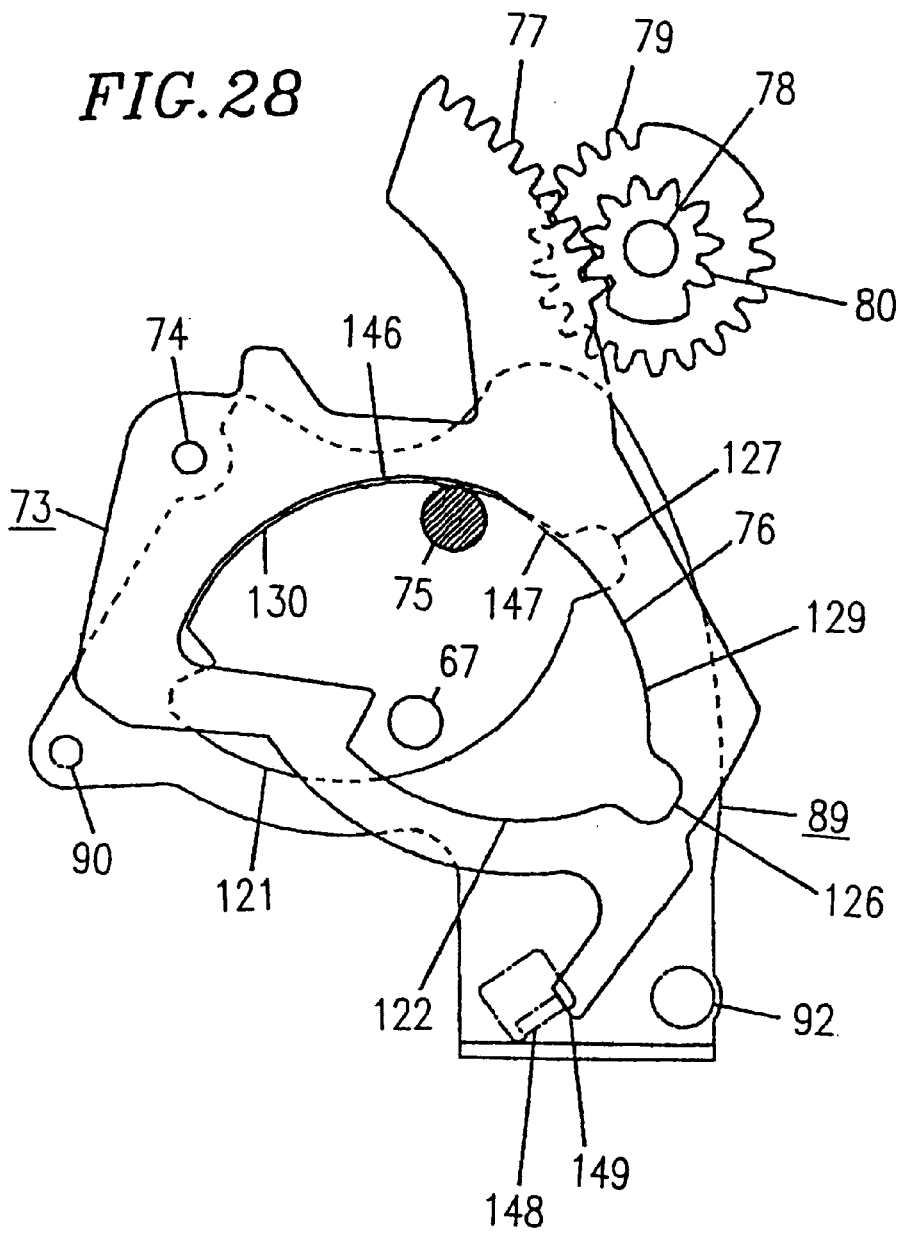
FIG. 28 is a plan view illustrating a state in which the boat driving arm and the sub-chassis driving arm are driven in the PLAY mode in one embodiment of the magnetic recording/reproduction apparatus.
Figure 29:
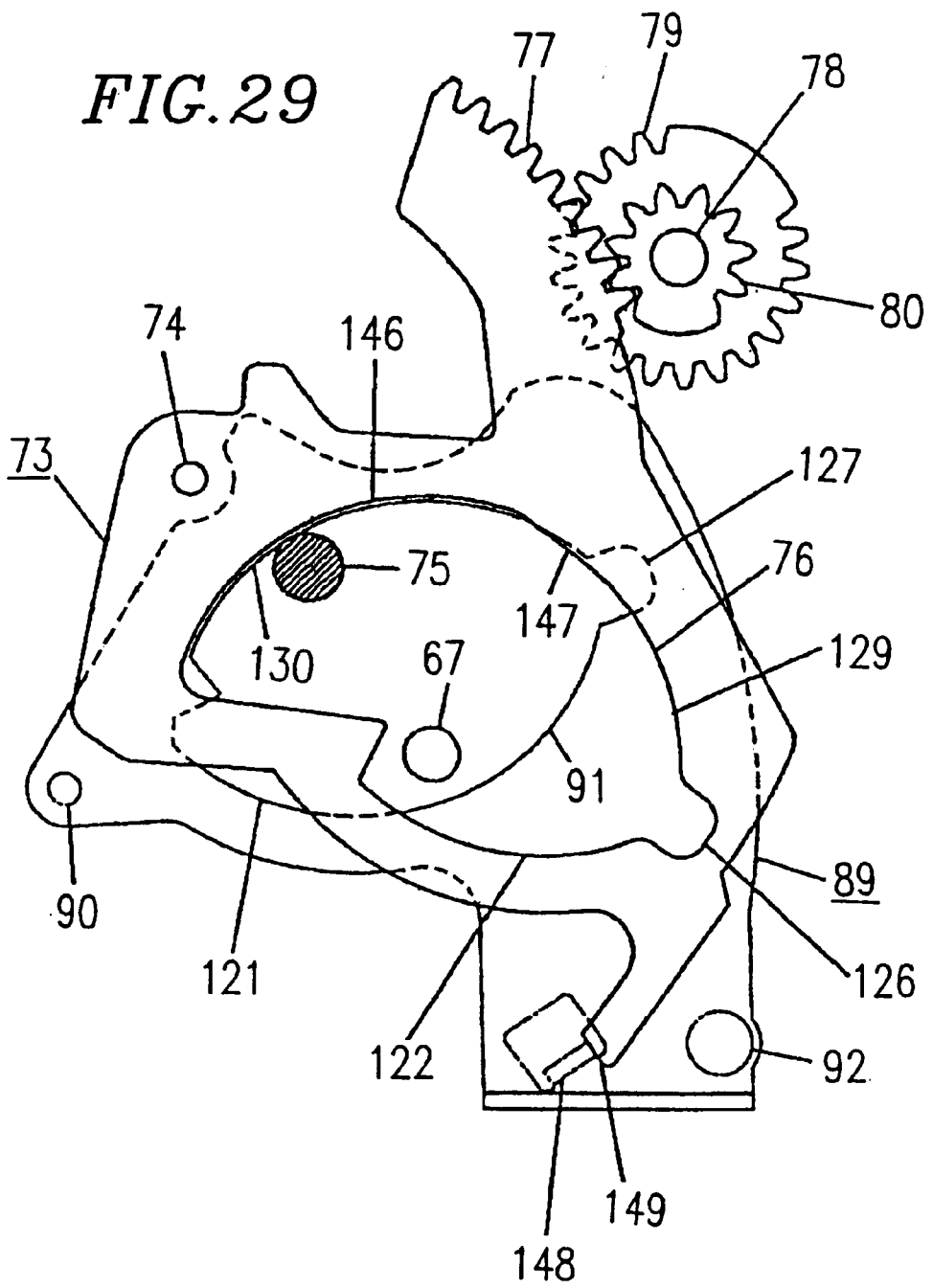
FIG. 29 is a plan view illustrating a state in which the boat driving arm and the sub-chassis driving arm are driven in the STOP mode in one embodiment of the magnetic recording/reproduction apparatus.
Figure 30:
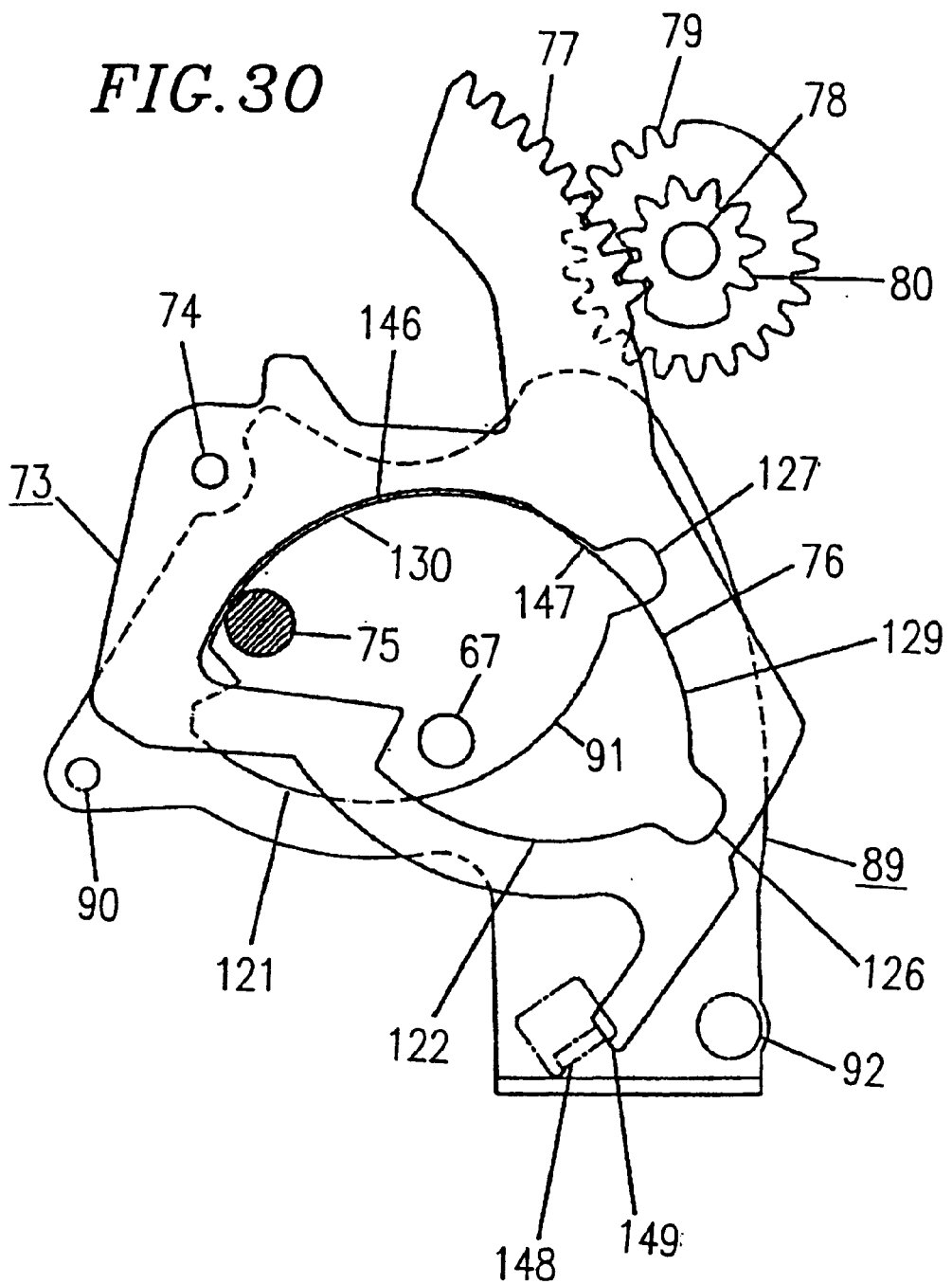
FIG. 30 is a plan view illustrating a state in which the boat driving arm and the sub-chassis driving arm are driven in the REV mode in one embodiment of the magnetic recording/reproduction apparatus.

FIG. 24 illustrates the UNLOADED mode, FIG. 25 illustrates the LOADING 1 mode, FIG. 26 illustrates the LOADING 2 mode, FIG. 27 illustrates PRE-PLAY mode which is a mode slightly before the mode shift from the LOADING 2 mode to the PLAY mode, FIG. 28 illustrates the PLAY mode, FIG. 29 illustrates the STOP mode, and FIG. 30 illustrates the REV mode.

FIGS. 31 through 35 are views illustrating the state in which the pinch arm 53 on the main chassis 8 and the T4 arm 28 on the sub-chassis 3 are driven by the pinch driving arm 97. The T4 arm 28 is not shown but only the T4 arm regulating pin 31 of the T4 arm 28 is shown in these figures.

Figure 31:
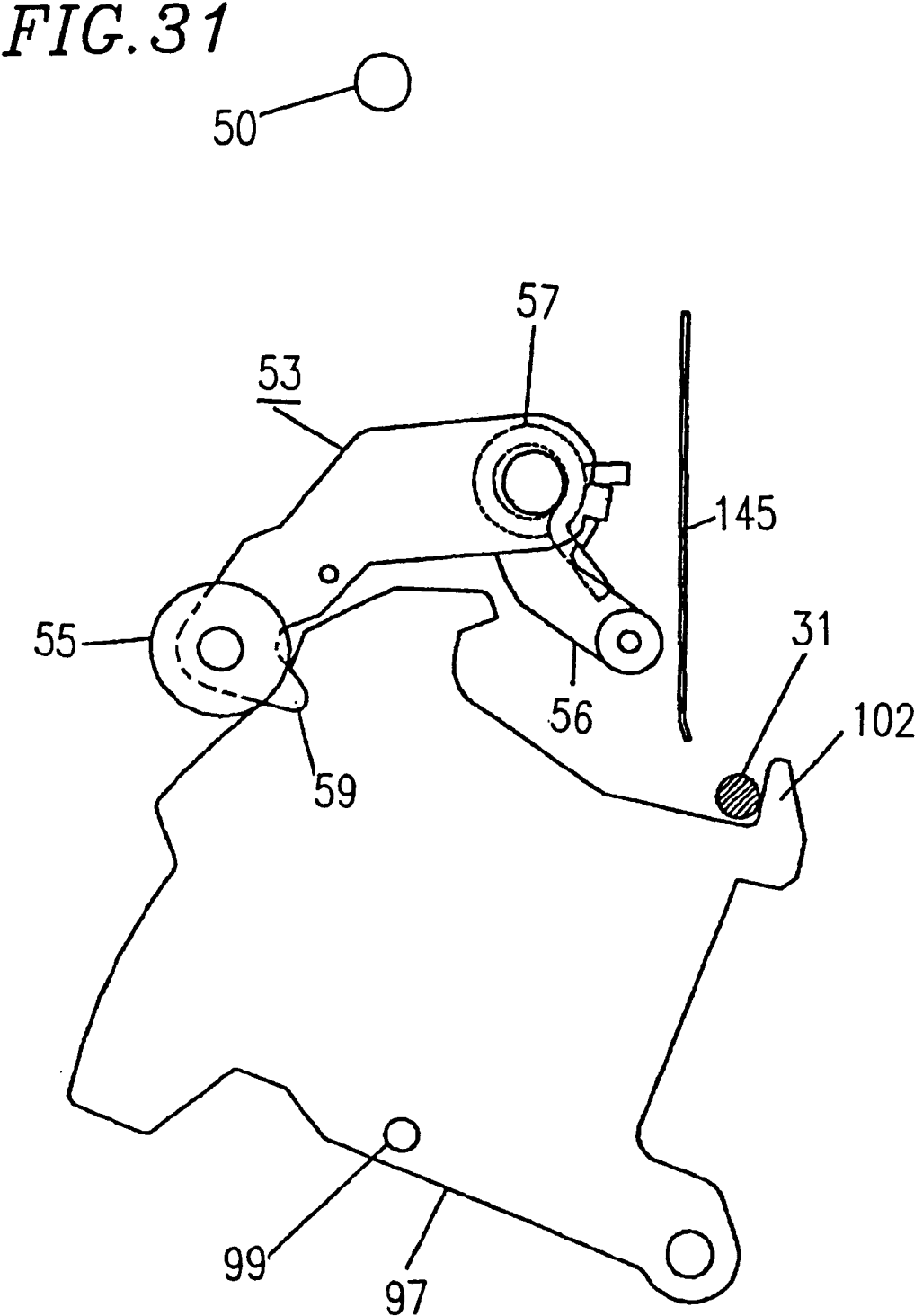
FIG. 31 is a plan view illustrating a state in which the pinch arm and the T4 arm are driven in the UNLOADED mode in one embodiment of the magnetic recording/reproduction apparatus.
Figure 32:
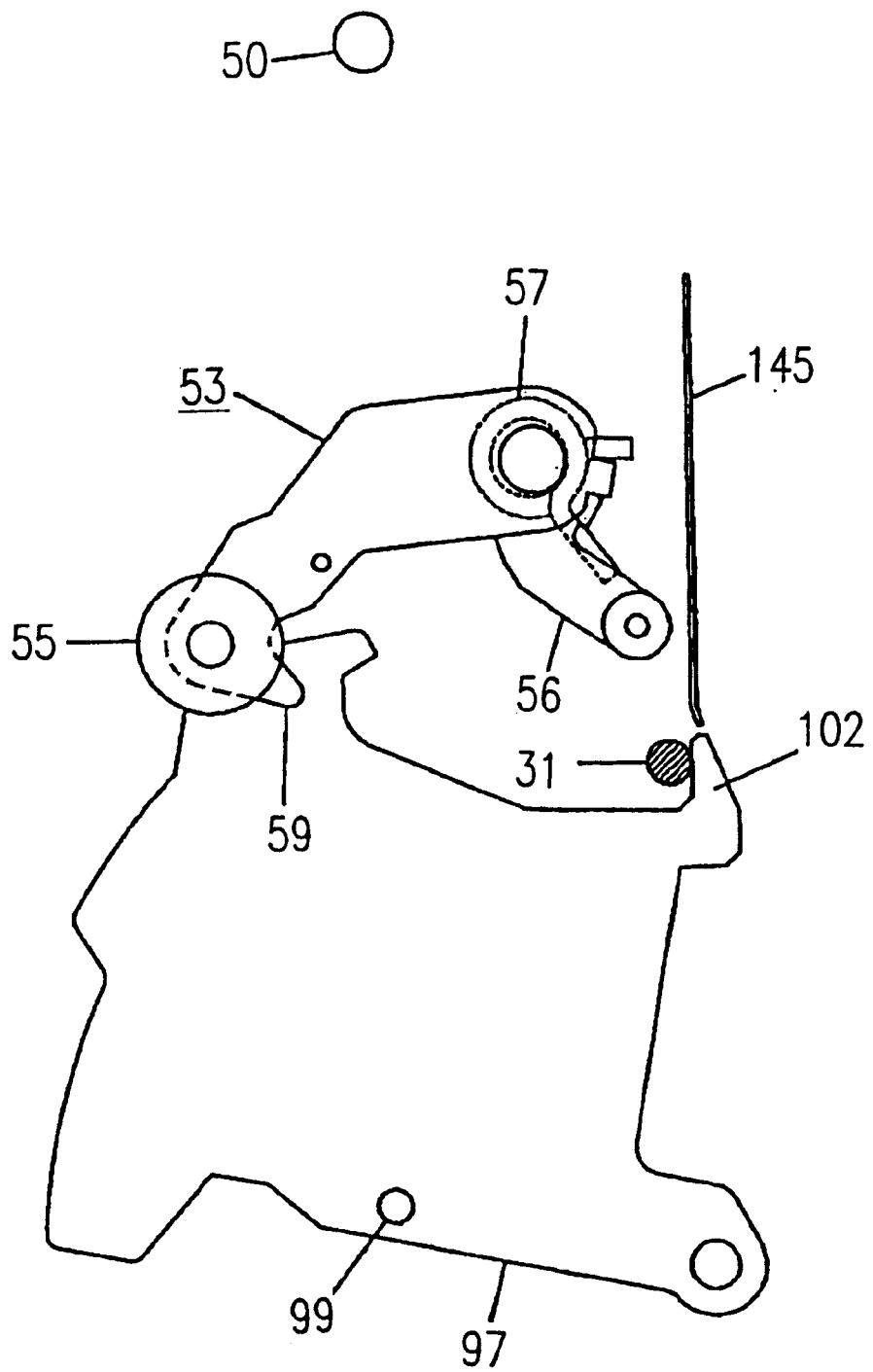
FIG. 32 is a plan view illustrating a state in which the pinch arm and the T4 arm are driven in the LOADING 1 mode in one embodiment of the magnetic recording/reproduction apparatus.
Figure 33:
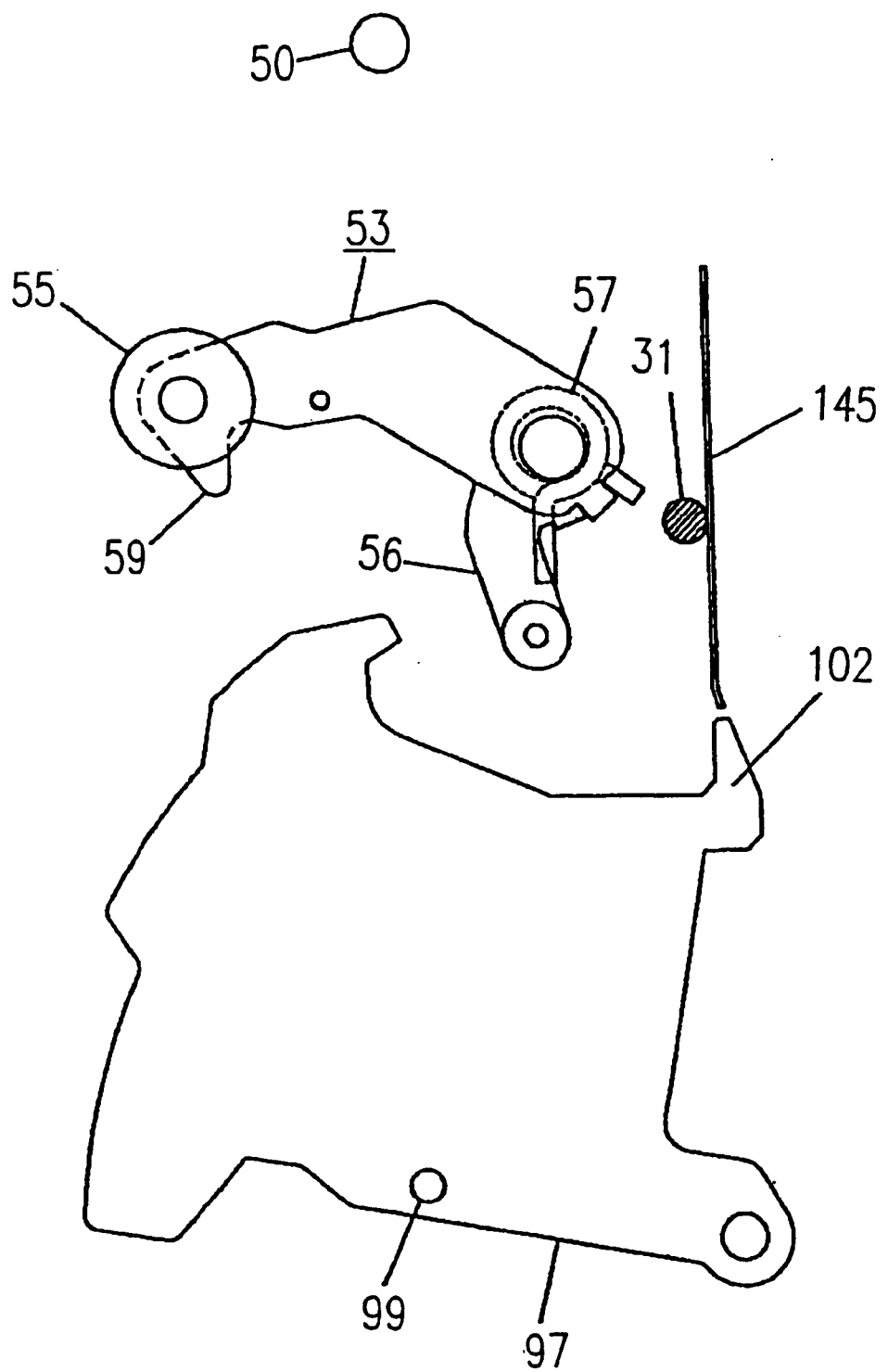
FIG. 33 is a plan view illustrating a state in which the pinch arm and the T4 arm are driven in the LOADING 2 mode in one embodiment of the magnetic recording/reproduction apparatus.
Figure 34:
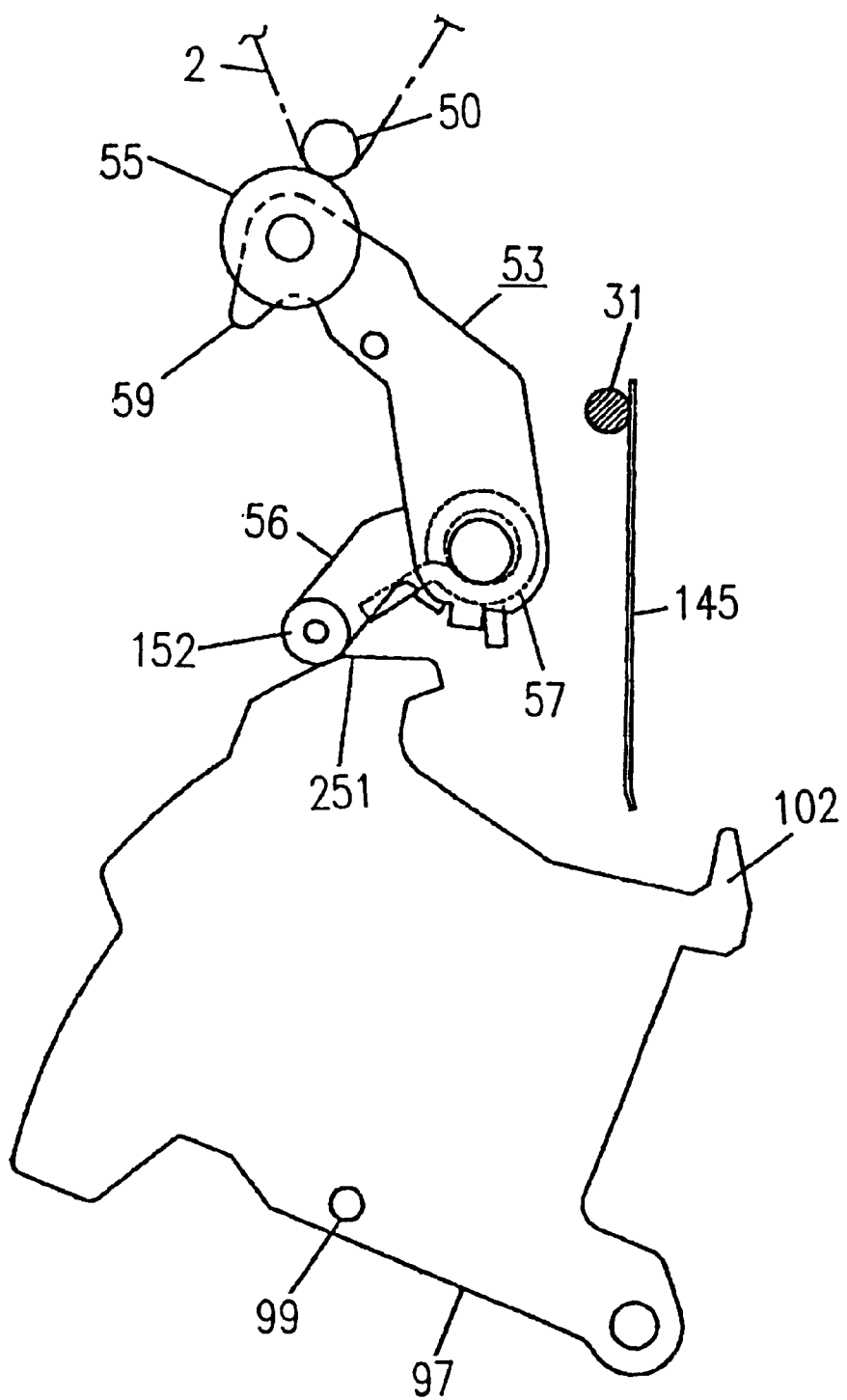
FIG. 34 is a plan view illustrating a state in which the pinch arm and the T4 arm are driven in the PLAY mode and the REV mode in one embodiment of the magnetic recording/reproduction apparatus.
Figure 35:
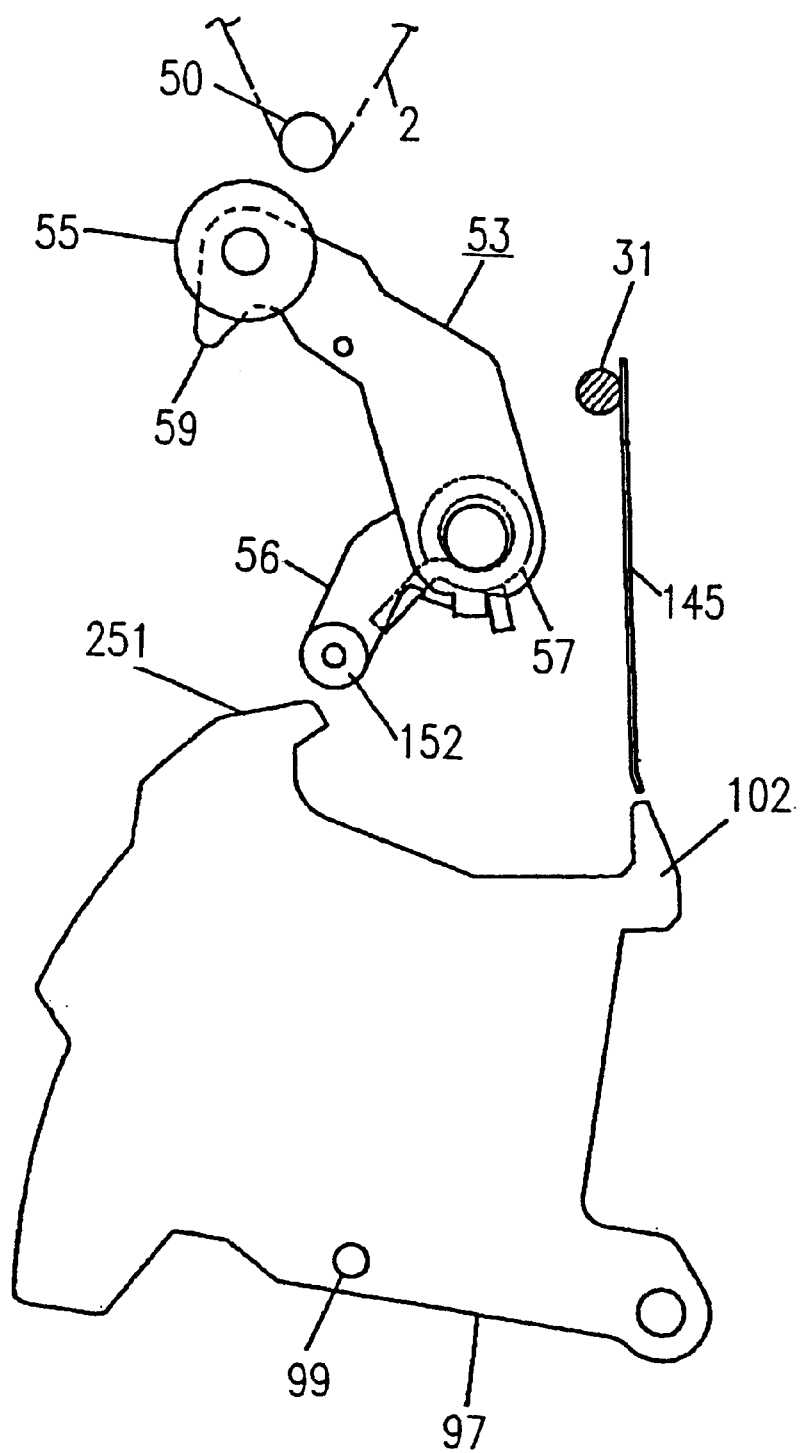
FIG. 35 is a plan view illustrating a state in which the pinch arm and the T4 arm are driven in the STOP mode in one embodiment of the magnetic recording/reproduction apparatus.

FIG. 31 illustrates the UNLOADED mode, FIG. 32 illustrates the LOADING 1 mode, FIG. 33 illustrates the LOADING 2 mode, FIG. 34 illustrates the PLAY mode and the REV mode, and FIG. 35 illustrates the STOP mode. The movement of the pinch driving arm 97, the pinch arm 53, and the T4 arm 28 are the same in the PLAY mode and the REV mode.

Hereinbelow, the operation of the magnetic recording/reproduction apparatus will be described for the respective states in order starting from the UNLOADED mode until the REV mode.

The UNLOADED mode will be described with reference to FIGS. 1, 3, 4, 24, and 31.

Referring to FIG. 1, the tape 2 has not been drawn out from the cassette 1. Referring to FIGS. 1, 3, and 24, the sub-chassis 3 is located at the most extended position from the main chassis 8. The driving pin 75 of the cam gear 66 is in contact with first arc portions 121 and 122 of the internal cams 91 and 76 of the sub-chassis driving arm 89 and the boat driving arm 73, respectively. The sub-chassis driving arm 89 and the boat driving arm 73 are both in the state of having swung clockwise to the maximum.

The S load gear 79 is in the state of having been rotated counterclockwise to the maximum by the gear portion 77 of the boat driving arm 73. This state of the S load gear 79 forces the S boat 39 to be located at the most forward position in the elongate hole 43 of the rail 42 as is understood from the construction shown in FIG. 5. Likewise, the T load gear 84 is in the state of having been rotated clockwise to the maximum. This state of the T load gear 84 forces the T boat 40 to be located at the most forward position in the elongate hole 43 of the rail 42 as is understood from the construction shown in FIG. 5.

Referring to FIGS. 1, 3, and 4, the tension plate 18 is forced to the most forward position by the tension plate driving arm 64. The tension arm 12 is then forced to a position of having swung clockwise to the maximum by the tension arm regulating pin 15 engaging with the cam groove 63 of the tension plate 18.

The pin 25 of the tension band regulating arm 21 is located in a bottom concave portion 123 of the cam 72 of the tension plate 18, while the position of the tension band regulating arm 21 is determined by the tension arm stop plate 116 (see FIG. 2). More specifically, the tension band regulating arm 21 is urged counterclockwise by the torsion coil spring 24 and abuts against the tension arm stop plate 116.

In the above state, the tension band 19 is slacked since the end 124 thereof comes closer to the S reel base 4. This slacking is however reduced since the other end 125 of the tension band 19 is moved away from the S reel base 4 by the tension band regulating arm 21.

The slacking of the tension band 19 is also reduced since the protrusion 118 of the tension band 19 is pressed by the band regulating protrusion 120 of the tension arm 12. Thus, the tension band 19 is prevented from being displaced from the S reel base 4 due to slacking of the tension band 19.

Referring to FIGS. 1, 3, and 31, the pinch arm 53 is forced to a position of having swung counterclockwise to the maximum by the tension spring 58. In this state, the pinch arm 53 is not in contact with the pinch driving arm 97. The T4 arm 28 is located at a position of having swung counterclockwise to the maximum.

Hereinbelow, the LOADING 1 mode will be described with reference to FIGS. 13, 18, 20, 25, and 32.

Referring to FIG. 13, the tape 2 has been drawn out to some extent by the tension post 14 and the T4 post 30. The tape 2 is also routed to pass around the S1 post 45 located above the S boat 39 and partly pass around the cylinder 38.

Referring to FIGS. 13, 18, and 25, the driving pin 75 extending from the cam gear 66 is still in contact with the first arc portion 121 of the sub-chassis driving arm 89, and thus the sub-chassis 3 has not been driven, keeping the same position as in the UNLOADED mode. On the other hand, the driving pin 75 has passed along the first arc portion 122 of the internal cam 76 of the boat driving arm 73 to a concave portion 126 thereof. By the engagement of the driving pin 75 with the concave portion 126, the boat driving arm 73 starts rotating counterclockwise. This allows the S boat 39 and the T boat 40 to move along the rail 42 in the direction in which the tape 2 is drawn out via the movements of the S load gear 79 and the T load gear 84.

Referring to FIGS. 13, 18, and 20, the tension plate 18 is moved backward (toward the cylinder 38) by the tension plate driving arm 64. With this movement, the tension arm regulating pin 15 moves in the guide groove 63 of the tension plate 18, to allow the tension arm 12 to rotate counterclockwise to draw out the tape 2.

With the movement of the tension plate 18, the tension band regulating arm 21 is swung clockwise by the engagement of the pin 25 with a protrusion 128 of the cam 72 of the tension plate 18. This causes the tension band 19 to be slacked with respect to the cylinder portion 26 of the S reel base 4, making the S reel base 4 rotatable.

Referring to FIGS. 13, 18, and 32, the pinch arm 53 remains at the same position as in the UNLOADED state since the sub-chassis 3 has not moved.

The T4 arm 28 allows the tape 2 to be drawn out clockwise by the abutment of the T4 regulating pin 31 with the protrusion 102 of the pinch driving arm 97.

The LOADING 2 mode will be described with reference to FIGS. 14, 19, 21, 26, and 33.

Referring to FIG. 14, the cassette 1 is moving toward the cylinder 38, and the tape 2 passes around the cylinder 38 via the S2 post 44, the S1 post 45, the T1 post 47, and the T2 post 46. While the S boat 39 and the T boat 40 have completed the movement to respective predetermined positions, the tension post 14 and the T4 post 30 are still under movement. Thus, a predetermined tape running path for recording/reproduction of the tape 2 has not been completed.

Referring to FIGS. 14, 19, and 26, the driving pin 75 of the cam gear 66 has passed along the first arc portion 121 of the internal cam 91 of the sub-chassis driving arm 89 to a concave portion 127 thereof. By the engagement of the driving pin 75 with the concave portion 127, the sub-chassis driving arm 89 starts rotating counterclockwise. Thus, the sub-chassis 3 starts moving toward the cylinder 38 via the guide pin 92.

The driving pin 75 has been disengaged from the concave portion 126 of the internal cam 91 of the boat driving arm 73 to come into contact with a second arc portion 129 thereof. The boat driving arm 73 is rotated when the driving pin 75 is in the concave portion 126. On the contrary, the boat driving arm 73 is held at a fixed position when the driving pin 75 is in contact with the first and second arc portion 122 and 129.

The boat driving arm 73 is located at a position of having rotated counterclockwise to the maximum. The S boat 39 and the T boat 40 have completed their movements to predetermined positions on the main chassis 8 via the engagements among the gear portion 77 of the boat driving arm 73, the S load gear 79, and the T load gear 84. V-shaped portions 143 and 144 of the S boat 39 and the T boat 40, respectively, engage with boat stoppers 141 and 142 provided on the main chassis 8, so as to position the S boat 39 and the T boat 40.

The S load gear 79 and the S load arm 81 rotate integrally during the movement of the S boat 39. Likewise, the T load gear 84 and the T load arm 86 rotate integrally during the movement of the T boat 40. The S load link 82 and the S load arm 81 are configured so that the S boat 39 reaches a predetermined position at a time slightly before the mode shift from the LOADING 1 mode to the LOADING 2 mode.

Likewise, the T load link 87 and the T load arm 86 are configured so that the T boat 40 reaches a predetermined position at a time slightly before the mode shift from the LOADING 1 mode to the LOADING 2 mode. During the remaining time until the start of the LOADING 2 mode, the boat driving arm 73 rotates the S load gear 79 clockwise and the T load gear 84 counterclockwise. As a result, since the S load gear 79 has rotated slightly relative to the S load arm 81, a torsion coil spring (not shown) resting between the S load gear 79 and the S load arm 81 is twisted. By the repulsive force of the twisted torsion coil spring, the S boat 39 is pressed against the boat stopper 141 and secured thereto. Likewise, since the T load gear 84 has rotated slightly relative to the T load arm 86, a torsion coil spring (not shown) resting between the T load gear 84 and the T load arm 86 is twisted. By the repulsive force of the twisted torsion coil spring, the T boat 40 is pressed against the boat stopper 142 and secured thereto.

Referring to FIGS. 14, 19, and 24, the relative positions of the tension arm 12 and the tension band regulating arm 21 with respect to the sub-chassis 3 are kept unchanged from those in the LOADING 1 mode by the tension plate 18 during the tape loading until immediately before the mode shift to the PLAY mode. More specifically, the tension arm 12 is located at a position fixed relative to the sub-chassis 3, and the tension band 19 is kept slacked with respect to the cylinder portion 26 of the S reel base 4 by the clockwise swinging of the tension band regulating arm 21 to allow the rotation of the S reel base 4.

Referring to FIGS. 14, 19, and 33, the protrusion 59 of the pinch arm 53 abuts against the wall 60 of the sub-chassis 3, to rotate the pinch arm 53 clockwise as the sub-chassis 3 moves.

As the sub-chassis 3 moves, the T4 regulating pin 31 extending from the T4 arm 28 moves from the protrusion 102 of the pinch driving arm 97 to a T4 guide 145 provided on the main chassis 8.

The T4 guide 145 also serves to hold the same relative position of the T4 arm 28 with respect to the sub-chassis 3 as that in the LOADING 1 mode during the movement of the sub-chassis 3.

Referring to FIG. 27, the PRE-PLAY mode, a mode slightly before the PLAY mode, will be described.

The driving pin 75 of the cam gear 66 has been disengaged from the concave portion 127 of the internal cam 91 of the sub-chassis driving arm 89 and is in contact with a second arc portion 130 thereof.

The sub-chassis driving arm 89 is located at a position of having swung counterclockwise to the maximum. Thus, the sub-chassis 3 has completed its movement to a predetermined position by the engagement of the guide pin 92 of the sub-chassis driving arm 89. The boat driving arm 73 is in the same position as that in the LOADING 2 mode since the driving pin 75 is in contact with the second arc portion 129 of the internal cam 76 of the boat driving arm 73.

Hereinbelow, the PLAY mode will be described with respect to FIGS. 15, 22, 28, and 34.

Referring to FIG. 15, the drawing out of the tape 2 from the cassette 1 has been completed, to complete the tape running path for recording/reproduction.

The complete tape running path will be described with reference to FIG. 15.

The tape 2 drawn out from a tape supply reel (not shown) located on the left side of the cassette 1 passes around the tension post 14, the S3 post 49 mounted on the main chassis 8, the S2 post 44, and then the S1 post 45 in this order before passing around the cylinder 38 at a predetermined contact angle and tilt angle based on the standard for the tape recording pattern. Thereafter, the tape 2 passes around the T1 post 46, the T2 post 47, and the T3 post 51, so as to resume the state without torsion or a height difference from the original state when it was drawn out from the cassette 1. The tape 2 then passes around the capstan shaft 50 which stands perpendicular to the tape passing direction and the T4 post 30 before being wound onto a winding reel (not shown) located on the right side of the cassette 1.

The tension post 14, the S3 post 49, the S2 post 44, the T2 post 47, and the T4 post 30 stand perpendicular to the tape passing direction, while the S1 post 45, the T1 post 46, the T3 post 51 are tilted with respect to the tape passing direction.

Referring to FIG. 28, the driving pin 75 of the cam gear 66 is in contact with the second arc portion 130 of the sub-chassis driving arm 89. The position of the sub-chassis driving arm 89 is the same as that in the PRE-PLAY mode shown in FIG. 27, and the movement of the sub-chassis 3 has been completed.

The driving pin 75 is also in contact with a third arc portion 146 of the internal cam 76 of the boat driving arm 73.

Referring to FIG. 5, the third arc portion 146 (range D) has a radius slightly greater than that of the second arc portion 129 (range C). A portion 147 (range E) is a hand-over portion between the second and third arc portions 129 and 146.

Referring to FIG. 28, the boat driving arm 73 is rotated clockwise slightly from the position in the PRE-PLAY mode shown in FIG. 27, allowing a protrusion 149 of the boat driving arm 73 to abut against a boat driving arm stopper 148 of the sub-chassis driving arm 89. This slight amount of return of the boat driving arm 73 in the PLAY mode from the position thereof in the PRE-PLAY mode is sufficiently smaller than the rotation phase differences between the S load gear 79 and the S load arm 81 and that between the T load gear 84 and the T load arm 86. Accordingly, the S boat 39 and the T boat 40 are kept pressed against the boat stoppers 141 and 142.

In and after the PLAY mode, therefore, the reactive force against the pressing of the S boat 39 and the T boat 40 is sustained, not by the driving pin 75, but by the boat driving arm stopper 148 of the sub-chassis driving arm 89. Accordingly, in and after the PLAY mode, the position of the boat driving arm 73 is determined, not by the driving pin 75, but by the boat driving arm stopper 148.

Referring to FIGS. 15 and 22, the tension arm regulating pin 15 is located in a top non-regulating portion 150 of the cam groove 63 of the tension plate 18. In this state, the tension plate 18 is not in contact with the tension arm regulating pin 15.

The pin 25 of the tension band regulating arm 21 is located at a top concave portion 151 of the cam 72 of the tension plate 18. As in the UNLOADED mode, the position of the tension band regulating arm 21 on the sub-chassis 3 is determined when the tension band regulating arm 21 abuts against the tension arm stop plate 116.

The position of the tension arm 12 is determined when the tension band 19 stretches around the cylinder portion 26 of the S reel base 4 without slacking by the tension of the tension spring 27. A friction force is generated between the tension band 19 and the cylinder portion 26 of the S reel base 4, and this friction force is subjected to feedback by the passing of the tape 2 around the tension post 14 with tension, whereby the tape tension is kept stabilized.

Accordingly, the position of the tension post 14 in the PLAY mode can be adjusted by moving the tension arm stop plate 116 to an appropriate position and securing it at this position with a screw (not shown).

Referring to FIG. 34, in the PLAY mode, the pinch driving arm 97 has been swung clockwise by the pinch cam gear 95. A pressing cam portion 251 of the pinch driving arm 97 presses the roller 152 which is rotatably mounted on the pinch pressing arm 56 via a shaft. This results in that the pinch roller 55 presses against the capstan shaft 50 via the tape 2 by the force of the torsion coil spring 57, to allow the tape 2 to run with the rotation of the capstan shaft 50. The position of the T4 arm 28 is held unchanged by the T4 guide 145.

The STOP mode will be described with reference to FIGS. 16, 23, 29, and 35.

Referring to FIG. 29, the positions of the sub-chassis driving arm 89 and the boat driving arm 73 are the same as those in the PLAY mode shown in FIG. 28. Only the position of the driving pin 75 of the cam gear 66 is different from that in the PLAY mode.

Referring to FIGS. 16 and 23, the tension plate 18 is moved slightly forward from the position thereof in the PLAY mode shown in FIG. 22 by the tension plate driving arm 64.

The positions of the tension arm 12 and the tension band regulating arm 21 relative to the sub-chassis 3 are the same as those in the LOADING 1 mode and the LOADING 2 mode.

Referring to FIGS. 16 and 35, the pinch driving arm 97 has been swung counterclockwise, and is not in contact with the roller 152 of the pinch pressing arm 56. The pinch arm 53 is urged counterclockwise by the tension spring 58, to abut against the wall 60 of the sub-chassis 3. In this state, the pinch roller 55 is away from the capstan shaft 50.

The REV mode will be described with reference to FIGS. 17, 23, 30, and 34.

Referring to FIG. 30, the positions of the sub-chassis driving arm 89 and the boat driving arm 73 are the same as those in the PLAY mode shown in FIG. 28 and the STOP mode shown in FIG. 29. Only the position of the driving pin 75 of the cam gear 66 is different from that in the PLAY mode and the STOP mode.

The tension plate 18 is not moved from the position in the STOP mode. The positions of the tension arm 12 and the tension band regulating arm 21 are the same as those in the STOP mode shown in FIG. 16.

The pinch driving arm 97 is rotated clockwise again from the position in the STOP mode shown in FIG. 35 to the position in the PLAY mode shown in FIG. 34, so that the pinch arm 53 resumes the state in the PLAY mode. The state of the T4 arm 28 is kept unchanged throughout the PLAY, STOP, and REV modes.

Hereinbelow, an S brake 161 and a T brake 162 acting on the S reel base 4 and the T reel base 5 respectively will be described with reference to FIG. 16.

Figure 36A:
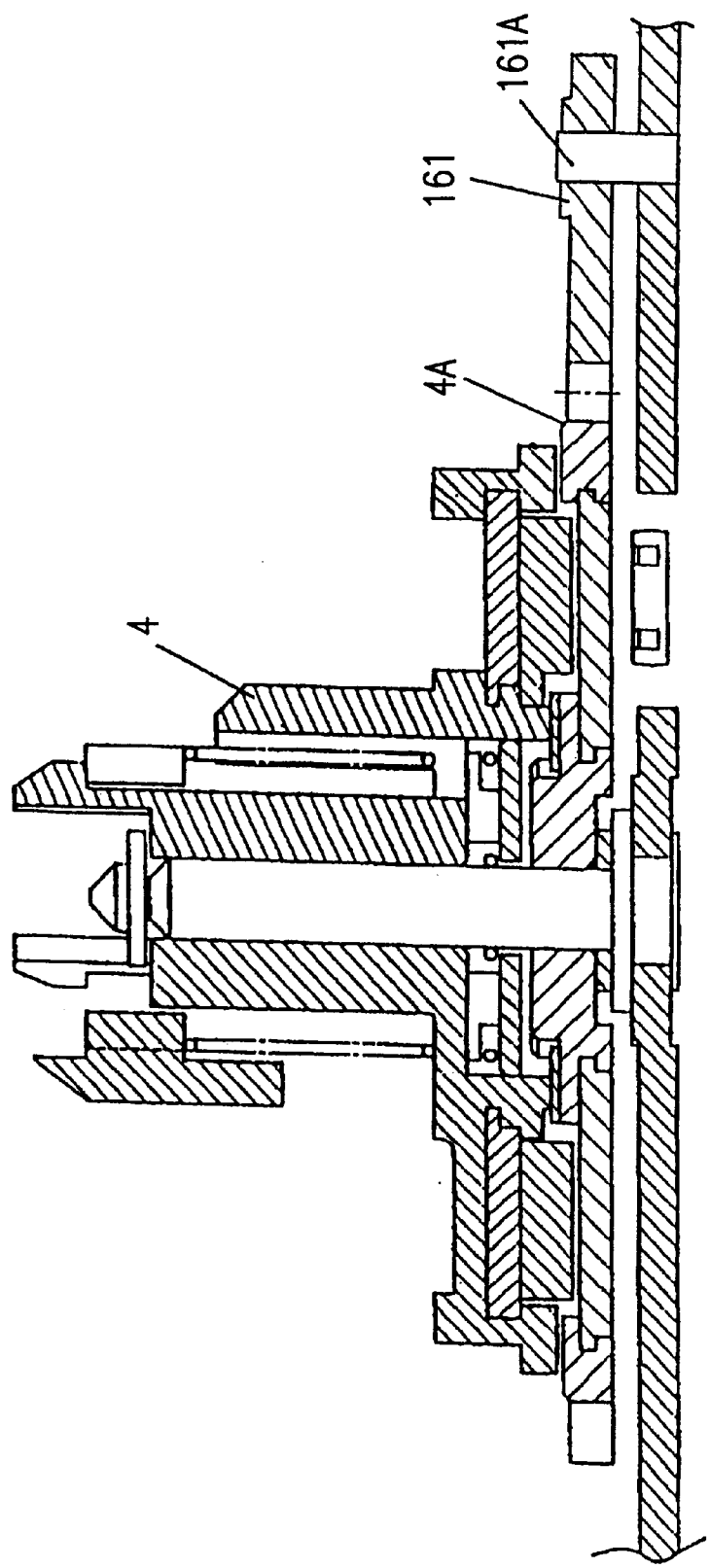
FIGS. 36A and 36B are cross-sectional views of the S reel base and the T reel base, respectively, together with components in the vicinity thereof of the magnetic recording/reproduction apparatus in a state where tape running is not performed (STOP mode)
Figure 36B:
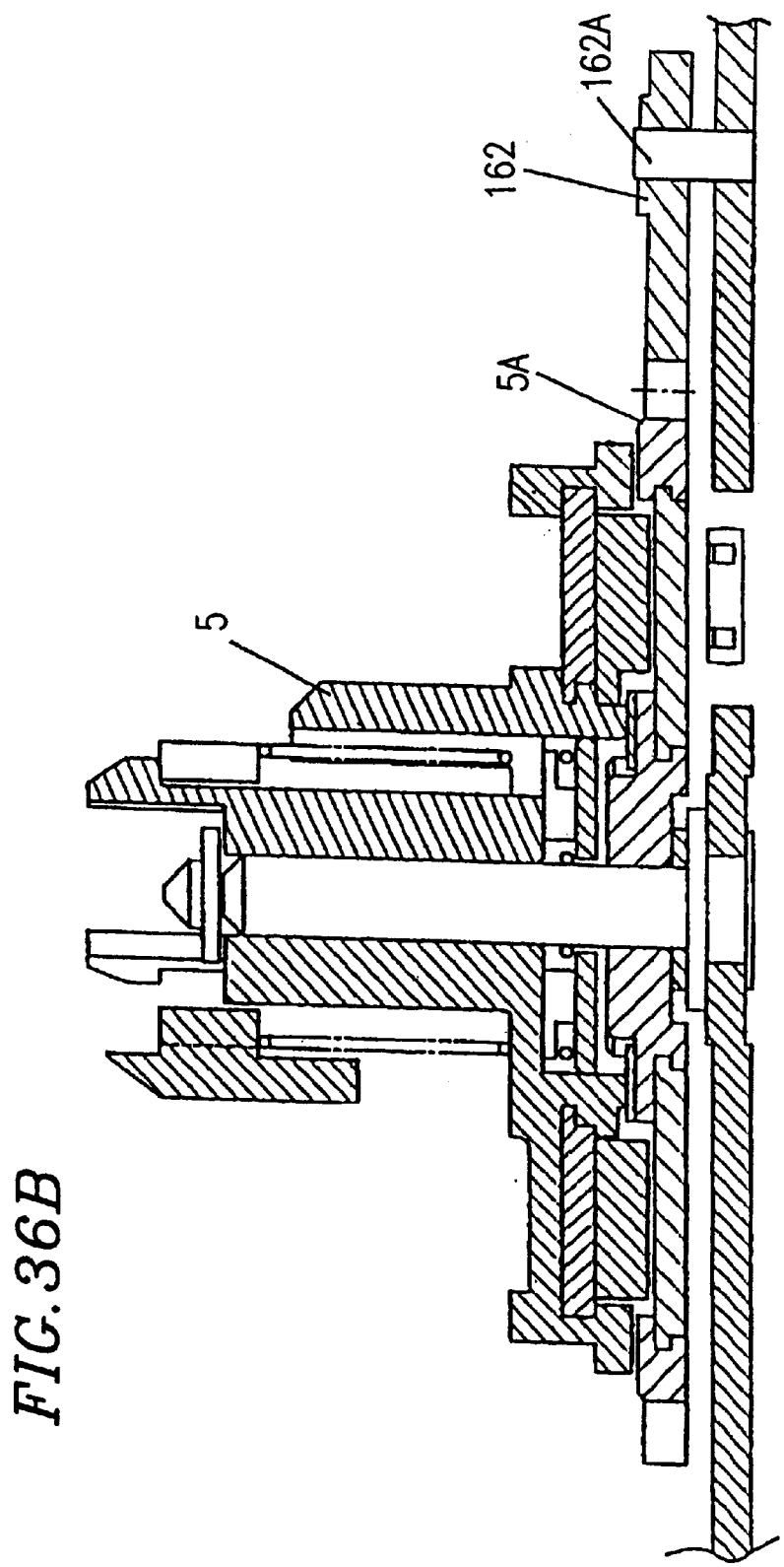
Figure 37:
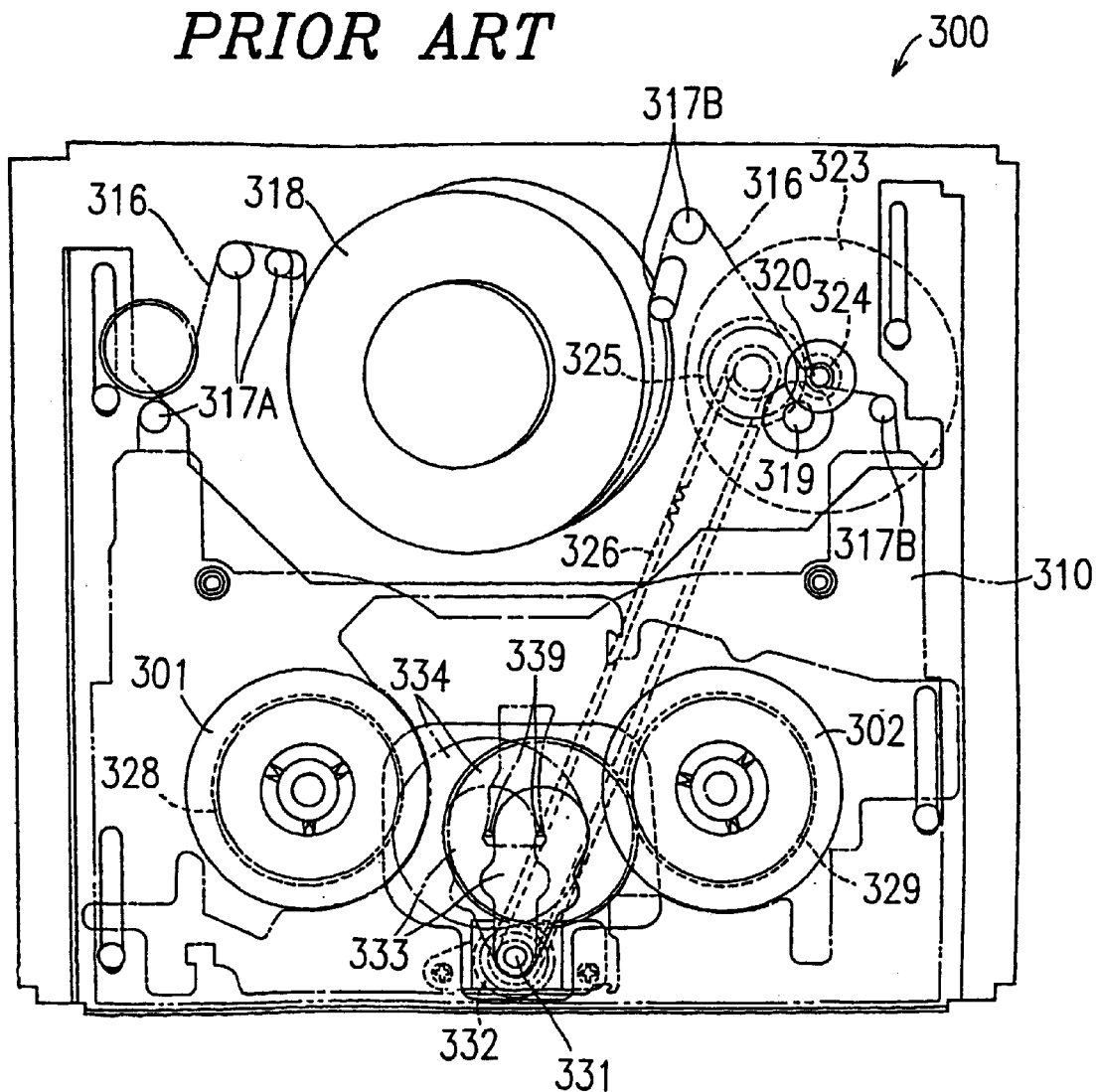
FIG. 37 is a plan view of a conventional magnetic recording/reproduction apparatus.

The S brake 161 and the T brake 162 are swingably attached to a shaft 161A and a shaft 162A, respectively, and urged counterclockwise and clockwise, respectively, by springs (not shown). The S brake 161 and the T brake 162 can be swung clockwise and counterclockwise, respectively, against the force of the springs, as necessary, by respective brake release means (not shown). FIGS. 36A and 36B are cross-sectional views of the S reel base 4 and the T reel base 5, respectively, together with the components in the vicinity thereof.

In the STOP mode shown in FIG. 16, the S brake 161 and the T brake 162 engage with gear portions 4A and 5A of the S reel base 4 and the T reel base 5, respectively. In this state, the gear portions 4A and 5A of the S reel base 4 and the T reel base 5 are blocked from rotating in the direction in which the tape 2 is drawn out. However, when the gear portions 4A and 5A are attempted to be rotated in the direction in which the tape 2 is wound, both the S brake 161 and the T brake 162 are forced, by the rotational force of the gear portions 4A and 5A, to swing clockwise and counterclockwise, respectively, allowing the gear portions 4A and 5A to be rotated.

Hereinbelow, the tape running in the magnetic recording/reproduction apparatus having the above configuration will be described.

In the PLAY mode shown in FIG. 15, the tape 2 runs in the direction indicated by arrow F. More specifically, the tape 2 is driven in the direction F by the pinch roller 55 and the capstan shaft 50, and wound onto the right-side reel (not shown) in the cassette 1 by the rotation of the T reel base 5 which is driven by the rotation of the capstan shaft 50 transmitted via the idler gear 7.

In the STOP mode shown in FIG. 16, since the pinch roller 55 and the capstan shaft 50 are away from each other, the tape 2 is not driven even when the idler 6 is swung toward the S reel base 4 or the T reel base 5 by the rotation of the capstan shaft 50. In the STOP mode, the S brake 161 and the T brake 162 act on the gear portions 4A and 5A of the S reel base 4 and the T reel base 5, respectively, to enable only the rotation thereof in one direction as described above.

In the REV mode shown in FIG. 17, the tape 2 runs in the direction indicated by arrow G. More specifically, the tape 2 is driven in the direction G by the pinch roller 55 and the capstan shaft 50, and wound onto the left-side reel (not shown) in the cassette 1 by the rotation of the S reel base 4 which is driven by the rotation of the capstan shaft 50 transmitted via the idler gear 7.

The mechanism driven by the cam gear 66 and the pinch cam gear 95 is configured so that the STOP mode is placed between the PLAY mode and the REV mode.

The shift from the PLAY mode to the REV mode will be described.

Referring to FIG. 15, in the PLAY mode where the tape 2 runs in the direction F, first the capstan shaft 50 stops, and then the mode shifts to the STOP mode shown in FIG. 16 which is the mode next to the PLAY mode in mechanism. After the completion of the mode shift, the capstan shaft 50 rotates clockwise for a predetermined time t1, to allow the idler gear 7 to swing counterclockwise. The rotation of the capstan shaft 50 then stops. The predetermined time t1 should be long enough for the idler gear 7 to disengage from the gear portion 5A of the T reel base 5 and engage with the gear portion 4A of the S reel base 4 to rotate the gear portion 4A.

Once the idler gear 7 engages with the gear portion 4A of the S reel base 4, the idler gear 7 attempts to rotate the gear portion 4A in the direction in which the tape is wound by the rotation of the capstan shaft 50. At this time, although the S brake 161 engages with the gear portion 4A, the engagement of the S brake 161 is released by the rotation of the gear portion 4A as described above. Thus, safe mode shift is accomplished without excessive torque being applied to the idler gear 7, the S reel base 4, the capstan shaft 50, and the like. The mode is then shifted to the REV mode shown in FIG. 17 which is the mode next to the STOP mode in mechanism. The REV mode is started by the clockwise rotation of the capstan shaft 50.

Thus, according to the embodiment of the present invention, when the forward running of the tape 2 is to be shifted to the reverse running, the rotation of the capstan shaft 50 in the forward direction is stopped once. While the pinch roller 55 is moved away from the capstan shaft 50, the capstan shaft 50 is rotated in the reverse direction by a predetermined amount, to swing the idler gear 7 to the S reel base 4. The rotation of the capstan shaft 50 is stopped again. Thereafter, the tape 2 is pressed against the capstan shaft 50 with the pinch roller 55, and the capstan shaft 50 is rotated in the reverse direction to allow the tape 2 to run in the reverse direction. This also allows the idler gear 7 to be coupled with the S reel base 4 and rotate in the direction in which the tape 2 is wound. By being provided with the components having the above functions, the mode shift from the PLAY mode to the REV mode can be accomplished without slacking of the tape, discontinuity of reversely reproduced images, or damaging of the tape. Moreover, since both the PLAY mode and the REV mode are next to the STOP mode in mechanism, the mode shift time from the STOP mode to the PLAY mode or the REV mode can be shortened.

The shift from the PLAY mode to the REV mode was described above. The shift from the REV mode to the PLAY mode can also be effectively accomplished in a manner similar to that described above. In this case, after the pinch roller 55 is released in the STOP mode and the idler gear 7 is swung from the S reel base 4 to the T reel base 5, the mode is shifted to the PLAY mode.

In the above description of the embodiment according to the present invention, the idler gear 7 corresponds to the idler defined in the claims appended hereto, the S reel base 4 corresponds to the supply reel base in the claims, and the T reel base 5 corresponds to the winding reel base in the claims. The PLAY mode corresponds to the first state in which the magnetic tape runs in the forward direction defined in the claims, the REV mode corresponds to the second state in which the magnetic tape runs in the backward direction in the claims, and the STOP mode corresponds to the third state in which the rotation of the capstan shaft stops and then the pinch roller moves away from the capstan shaft in the claims.

Thus, according to the present invention, the mode can be shifted from the PLAY mode to the REV mode or vice versa without slacking of the tape, discontinuity of reversely reproduced images, or damaging of the tape. Moreover, the mode shift time from the STOP mode to the PLAY mode or the REV mode can be shortened.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording/reproduction apparatus for recording/reproducing information on/from a magnetic tape by drawing out the magnetic tape from a tape cassette and allowing the magnetic tape to pass around a rotary head cylinder having a rotary head for a predetermined arc, the apparatus comprising:

a capstan shaft for driving the magnetic tape;

a pinch roller for pressing the magnetic tape against the capstan shaft;

a first reel base rotatably attached to a shaft, the first reel base engaging with a first reel for holding the magnetic tape wound onto the first reel located in the tape cassette;

a second reel base rotatably attached to a shaft, the second reel base engaging with a second reel for holding the magnetic tape wound onto the second reel located in the tape cassette; and an idler supported swingably to swing to the second reel base when the capstan shaft is rotated in a first direction and to the first reel base when the capstan shaft is rotated in a second direction, wherein the idler includes a gear portion which rotates in association with the rotation of the capstan shaft, when the running of the magnetic tape is to be shifted from the first direction to the second direction, the rotation of the capstan shaft in the first direction stops, the pinch roller moves away from the capstan shaft, the capstan shaft is rotated in the second direction by a predetermined amount so that the idler swings to the first reel base, the capstan shaft stops again, the pinch roller presses the magnetic tape against the capstan shaft, and the capstan shaft is rotated again in the second direction to allow the magnetic tape to run in the second direction and the gear portion to be coupled with the first reel base, the gear portion rotating the first reel base in a direction in which the magnetic tape is wound onto the first reel.

2. A magnetic recording/reproduction apparatus according to claim 1, wherein the first reel comprises a supply reel, the first reel base comprises a supply reel base, the second reel comprises a winding reel, the second reel base comprises a winding reel base, the first direction comprises a forward direction in which the magnetic tape runs from the supply reel toward the winding reel, and the second direction comprises a backward direction in which the magnetic tape runs from the winding reel toward the supply reel.

3. A magnetic recording/reproduction apparatus according to claim 1, wherein the first reel comprises a winding reel, the first reel base comprises a winding reel base, the second reel comprises a supply reel, the second reel base comprises a supply reel base, the first direction comprises a backward direction in which the magnetic tape runs from the winding reel toward the supply reel, and the second direction comprises a forward direction in which the magnetic tape runs from the supply reel toward the winding reel.

4. A magnetic recording/reproduction apparatus according to claim 1, wherein the magnetic recording/reproduction apparatus includes:

a first state in which the magnetic tape runs in the forward direction from the supply reel to the winding reel;

a second state in which the magnetic tape runs in the backward direction from the winding reel to the supply reel; and a third state in which the rotation of the capstan shaft stops and then the pinch roller moves away from the capstan shaft, and the magnetic recording/reproduction apparatus includes a mechanism in which the third state is placed between the first state and the second state.

5. A magnetic recording/reproduction apparatus according to claim 1, wherein, when the running of the magnetic tape is to be shifted from the first direction to the second direction, the rotation of the capstan shaft in the first direction stops, the pinch roller moves away from the capstan shaft, the capstan shaft is rotated in the second direction by a predetermined amount so that the gear portion is coupled with the first reel base to rotate the first reel base in a direction in which the magnetic tape is wound onto the first reel, the capstan shaft stops again, the pinch roller presses the magnetic tape against the capstan shaft, and the capstan shaft is rotated again in the second direction to allow the magnetic tape to run in the second direction and to allow the first reel base to rotate in the direction in which the magnetic tape is wound onto the first reel.

6. A magnetic recording/reproduction apparatus according to claim 5, wherein the first reel comprises a supply reel,
the first reel base comprises a supply reel base,
the second reel comprises a winding reel,
the second reel base comprises a winding reel base,
the first direction comprises a forward direction in which the magnetic tape runs from the supply reel toward the winding reel, and
the second direction comprises a backward direction in which the magnetic tape runs from the winding reel toward the supply reel.

7. A magnetic recording/reproduction apparatus according to claim 5, wherein the first reel comprises a winding reel,
the first reel base comprises a winding reel base,
the second reel comprises a supply reel,
the second reel base comprises a supply reel base,
the first direction comprises a backward direction in which the magnetic tape runs from the winding reel toward the supply reel, and
the second direction comprises a forward direction in which the magnetic tape runs from the supply reel toward the winding reel.

* * * * *